US008077333B2

(12) United States Patent
Mori et al.

(10) Patent No.: US 8,077,333 B2
(45) Date of Patent: Dec. 13, 2011

(54) PRINTING CONTROL APPARATUS AND PRINTING CONTROL METHOD

(75) Inventors: Akihito Mori, Ibaraki (JP); Akihiko Noda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 943 days.

(21) Appl. No.: 10/656,118

(22) Filed: Sep. 8, 2003

(65) Prior Publication Data

US 2004/0046992 A1 Mar. 11, 2004

(30) Foreign Application Priority Data

Sep. 9, 2002 (JP) ................................. 2002-263129
Nov. 26, 2002 (JP) ................................. 2002-342717
Nov. 26, 2002 (JP) ................................. 2002-342718

(51) Int. Cl.
*G06F 3/00* (2006.01)
(52) U.S. Cl. ..................... 358/1.15; 358/1.13; 358/1.14; 715/709; 715/705; 399/8
(58) Field of Classification Search ................. 358/1.15, 358/1.14, 1.13; 399/81, 82, 83, 8; 715/526, 715/740, 704, 705, 709; 709/201
See application file for complete search history.

(56) References Cited

U.S. PATENT DOCUMENTS

| | | | | | |
|---|---|---|---|---|---|
| 5,309,558 | A | * | 5/1994 | Rourke et al. | 358/1.1 |
| 5,331,442 | A | * | 7/1994 | Sorimachi | 358/532 |
| 5,550,997 | A | * | 8/1996 | Ip et al. | 711/103 |
| 6,052,684 | A | * | 4/2000 | Du | 707/8 |
| 6,128,451 | A | * | 10/2000 | Fukuchi | 399/75 |
| 6,134,568 | A | * | 10/2000 | Tonkin | 715/209 |
| 6,232,968 | B1 | * | 5/2001 | Alimpich et al. | 715/744 |
| 6,239,800 | B1 | * | 5/2001 | Mayhew et al. | 715/764 |
| 6,371,471 | B1 | | 4/2002 | Fukazu et al. | |
| 6,535,294 | B1 | * | 3/2003 | Arledge et al. | 358/1.15 |
| 6,709,176 | B2 | * | 3/2004 | Gotoh et al. | 400/61 |
| 6,785,022 | B1 | * | 8/2004 | Todaka | 358/442 |
| 6,928,564 | B2 | | 8/2005 | Tada et al. | |
| 7,028,303 | B2 | * | 4/2006 | Lahey et al. | 718/106 |
| 7,509,529 | B2 | * | 3/2009 | Colucci et al. | 714/14 |
| 7,640,548 | B1 | * | 12/2009 | Yu et al. | 718/106 |

(Continued)

FOREIGN PATENT DOCUMENTS

JP 9-062467 3/1997

(Continued)

OTHER PUBLICATIONS

Office Action, dated Sep. 5, 2008, in JP 2002-342717.

*Primary Examiner* — Charlotte M Baker
*Assistant Examiner* — Dennis Dicker
(74) *Attorney, Agent, or Firm* — Fitzpatrick, Cella, Harper & Scinto

(57) ABSTRACT

This invention discloses a printing control apparatus capable of allowing even an inexperienced operator to execute a printing process by properly and efficiently using a plurality of printing devices in accordance with the contents of each job, printing conditions, and the like. A printing control apparatus according to a preferred embodiment of this invention determines device combinations suitable for the attributes of a printing job from performance information of the devices and the attributes of the printing job. The printing control apparatus presents the combinations so as to be able to select one of them, and displays an explanation of printing process steps using the selected combination.

10 Claims, 35 Drawing Sheets

U.S. PATENT DOCUMENTS

| | | | |
|---|---|---|---|
| 7,903,271 B2 * | 3/2011 | Aiyama | 358/1.15 |
| 2001/0044868 A1 * | 11/2001 | Roztocil et al. | 710/129 |
| 2001/0046065 A1 * | 11/2001 | Furukawa et al. | 358/1.15 |
| 2002/0101604 A1 * | 8/2002 | Mima et al. | 358/1.15 |
| 2003/0105738 A1 * | 6/2003 | Taketa et al. | 707/1 |
| 2003/0142348 A1 * | 7/2003 | Hiramatsu et al. | 358/1.15 |
| 2003/0206314 A1 * | 11/2003 | Tanimoto | 358/1.15 |
| 2004/0107119 A1 * | 6/2004 | Ohishi | 705/2 |
| 2011/0046065 A1 * | 2/2011 | Klinger | 514/17.9 |

FOREIGN PATENT DOCUMENTS

| | | |
|---|---|---|
| JP | 2000-163237 | 6/2000 |
| JP | 2000-347827 | 12/2000 |
| JP | 2001-34116 | 2/2001 |
| JP | 2001-236187 | 8/2001 |
| JP | 2002-144681 | 5/2002 |
| JP | 2002-259099 | 9/2002 |
| JP | 2002-300332 | 10/2002 |

* cited by examiner

F I G. 1
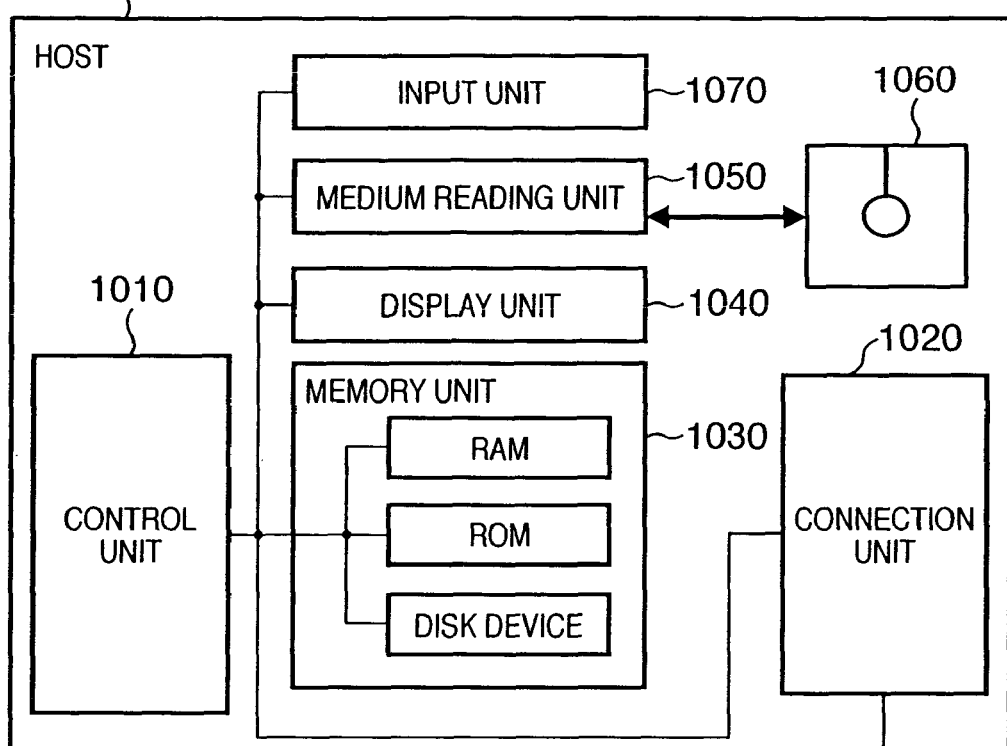
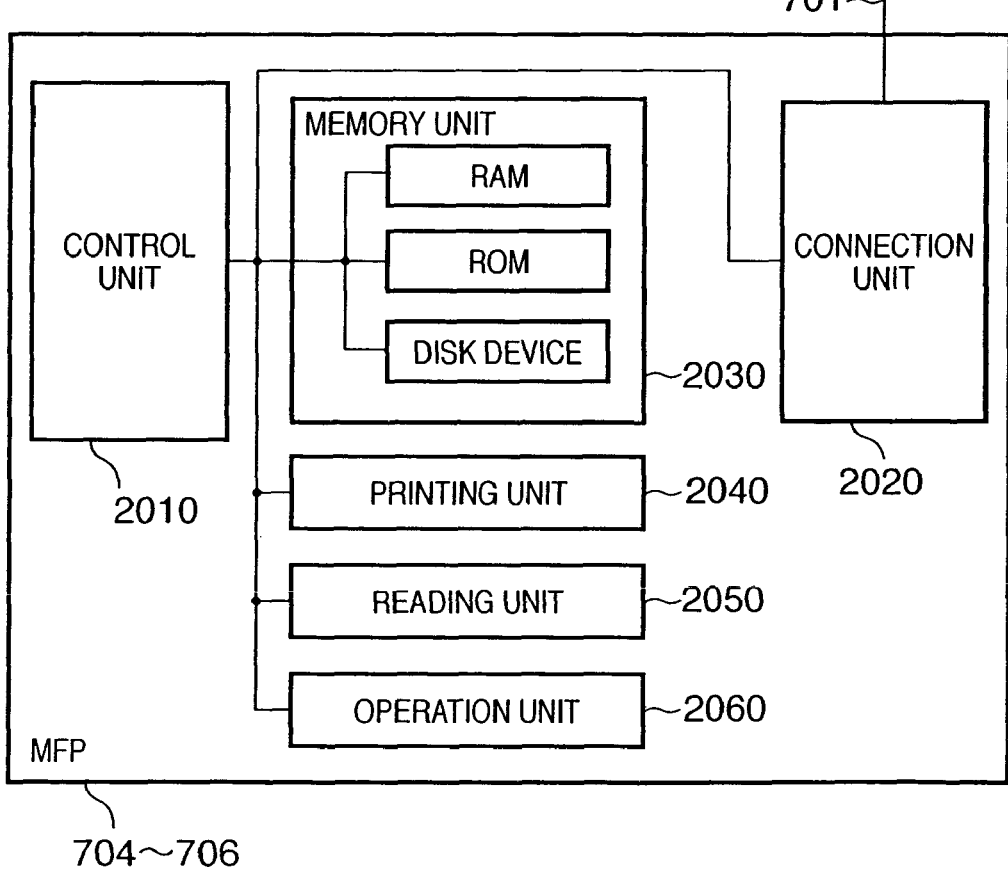

FIG. 9

PRINTING ATTRIBUTE SETTING

INDISPENSABLE
- NUMBER OF COPIES : 2000
- QUALITY : HIGH QUALITY
- COLOR : MONOCHROME

LAYOUT
- ORIGINAL SIZE : A4
- OUTPUT SIZE : A4
- IMPOSITION : TWO SIDES

OUTPUT FORM
- STAPLE : NO STAPLE
- BOOKBINDING : NO BIND
- Z-FOLDING : NO Z-FOLD
- INSERT : NO INSERT
- PUNCH : NO PUNCH
- CUTTING : NO CUT

91 — CONFIRM OUTPUT FORM
92 — CANCEL
93 — COMPLETE PRINTING ATTRIBUTE SETTING

FIG. 10

PRINTING ATTRIBUTE SETTING

INDISPENSABLE
NUMBER OF COPIES : | 2000 ▶ |
QUALITY : | HIGH QUALITY ▶ |
COLOR : | MONOCHROME ▶ |

LAYOUT
ORIGINAL SIZE : | A4 + A3 ▶ |
OUTPUT SIZE : | A4 + A3 ▶ |
IMPOSITION : | TWO SIDES ▶ |

OUTPUT FORM
STAPLE : | NO STAPLE ▶ |
BOOKBINDING : | BIND ▶ |
Z-FOLDING : | Z-FOLD ▶ |
INSERT : | NO INSERT ▶ |
PUNCH : | NO PUNCH ▶ |
CUTTING : | CUT ▶ |

91 — CONFIRM OUTPUT FORM
92 — CANCEL
93 — COMPLETE PRINTING ATTRIBUTE SETTING

F I G. 14
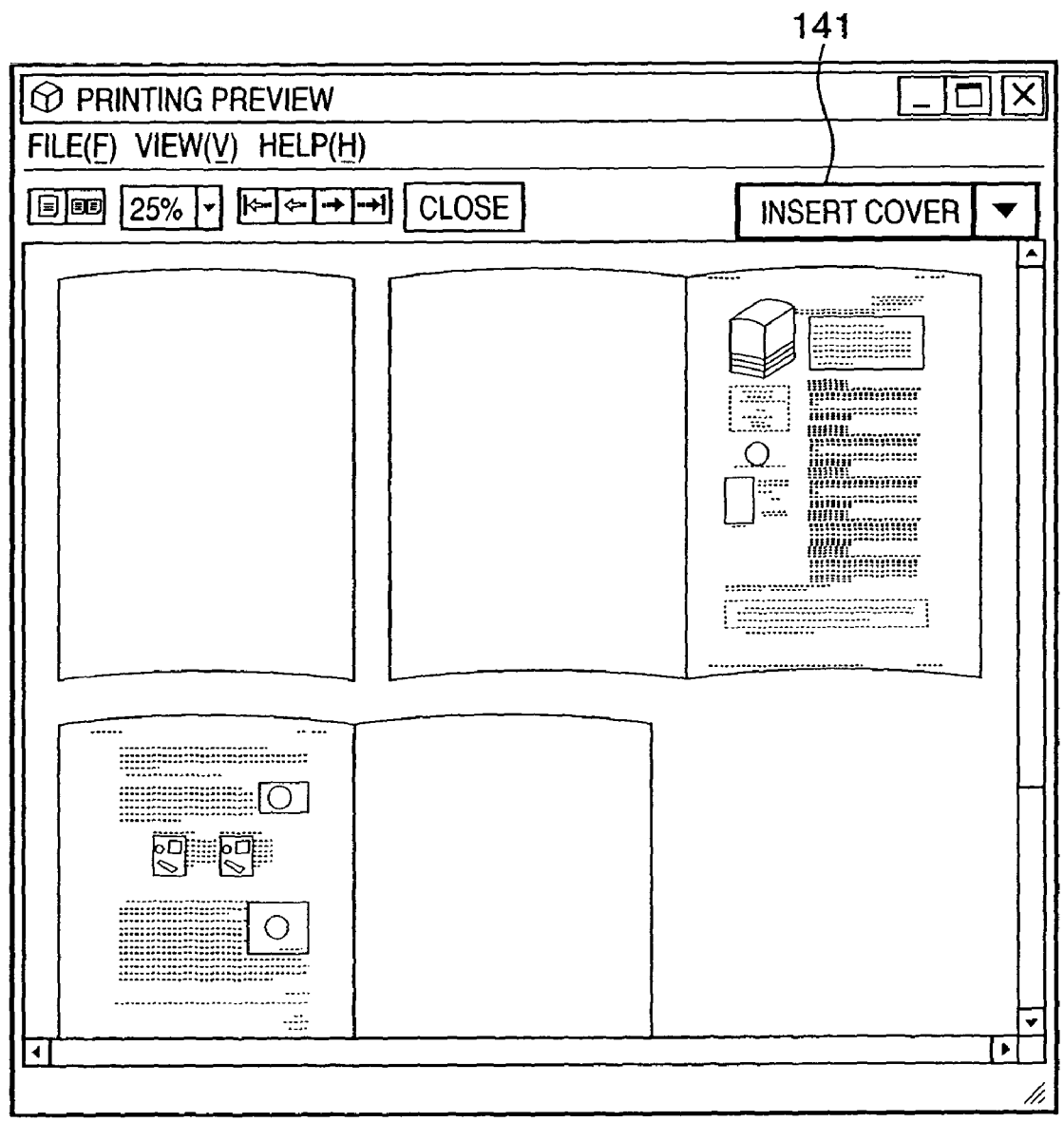

F I G. 17
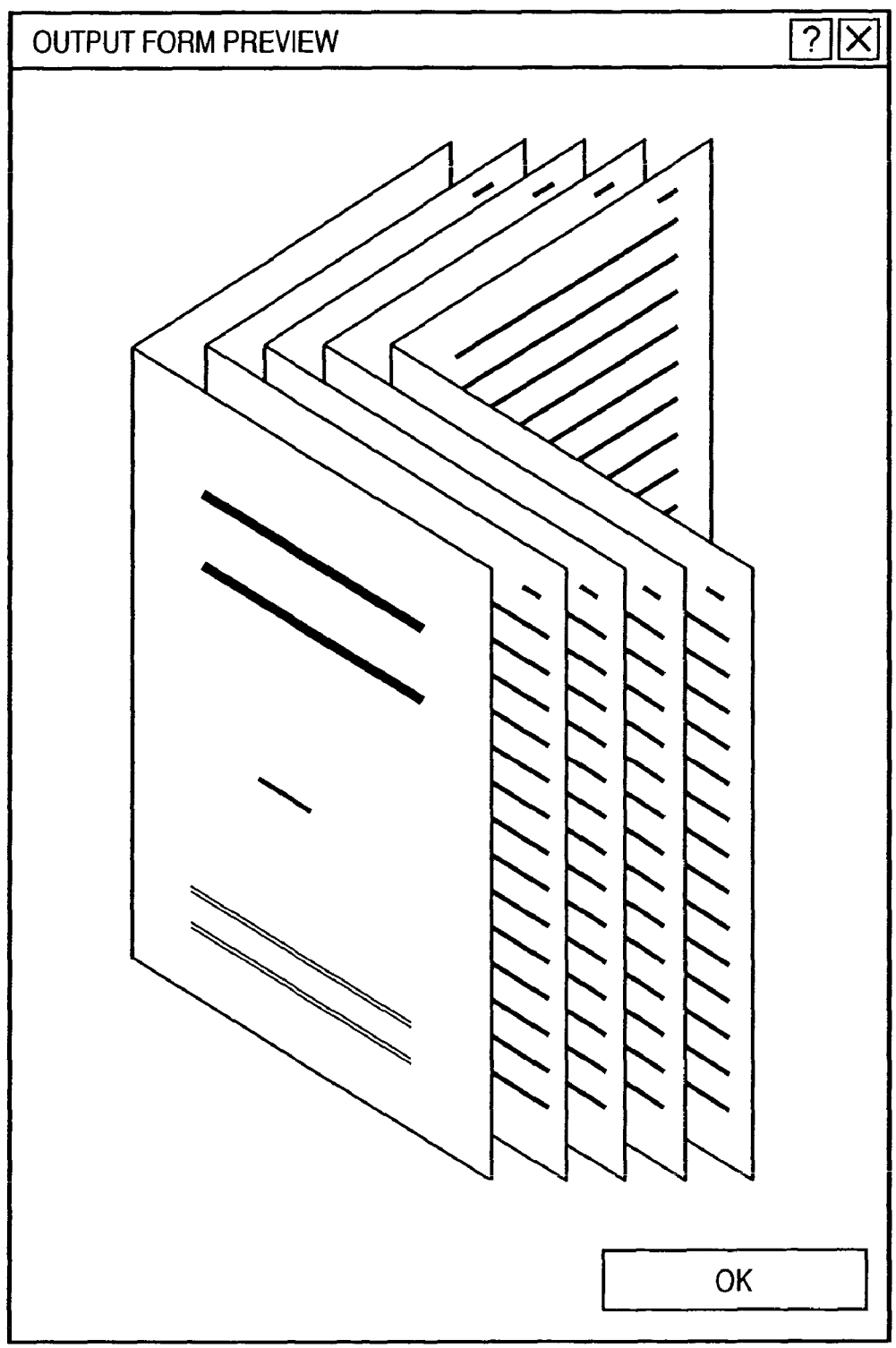

FIG. 19

| NUMBER OF COPIES | 2,000 COPIES |
|---|---|
| QUALITY | HIGH QUALITY |
| COLOR | MONOCHROME |
| ORIGINAL SIZE | A4 |
| OUTPUT SIZE | A4 |
| IMPOSITION | TWO SIDES |
| STAPLE | NO STAPLE |
| BOOKBINDING | NO BIND |
| Z-FOLDING | NO Z-FOLD |
| INSERT | NO INSERT |
| PUNCH | NO PUNCH |
| CUTTING | NO CUT |
| : | : |

F I G. 20

| NUMBER OF COPIES | 2,000 COPIES |
|---|---|
| QUALITY | HIGH QUALITY |
| COLOR | MONOCHROME |
| ORIGINAL SIZE | A4 + A3 |
| OUTPUT SIZE | A4 + A3 |
| IMPOSITION | TWO SIDES |
| STAPLE | NO STAPLE |
| BOOKBINDING | BIND |
| Z-FOLDING | Z-FOLD |
| INSERT | NO INSERT |
| PUNCH | NO PUNCH |
| CUTTING | CUT |
| : | : |

FIG. 21

| NAME | ADDRESS | PERFORMANCE |
|------|---------|-------------|
| Dev-A | 00:11:22:33:AA | |
| Dev-B | 00:11:22:33:BB | |
| Dev-C | 00:11:22:33:CC | |
| Dev-D | 00:11:22:33:DD | |
| Dev-E | 00:11:22:33:EE | |
| Dev-F | 00:11:22:33:FF | |
| Dev-G | 00:11:22:33:GG | |
| .. | .. | |

F I G. 22

| NAME | ADDRESS | PERFORMANCE | COST |
|---|---|---|---|
| Dev-A | 00:11:22:33:AA | MONOCHROME / 30 ppm / MAX-A3 / TWO SIDES / PUNCH / ... | 6 |
| Dev-B | 00:11:22:33:BB | COLOR / 20 ppm / MAX-A3 / TWO SIDES / INSERT ( COVER, SLIP SHEET, TAB SHEET ) / ... | 8 |
| Dev-C | 00:11:22:33:CC | MONOCHROME / 100 ppm / MAX-A4 / TWO SIDES / BOOKBINDING ( BUNDLE, PACKAGE ) / Z-FOLDING / ... | 9 |
| Dev-D | 00:11:22:33:DD | MONOCHROME / 50 ppm / MAX-A3 / TWO SIDES / BOOKBINDING ( BUNDLE, PACKAGE ) / Z-FOLDING / ... | 5 |
| Dev-E | 00:11:22:33:EE | MONOCHROME / 10 ppm / MAX-A3 / TWO SIDES / QUALITY ( DRAFT, STANDARD, HIGH QUALITY ) / ... | 4 |
| Dev-F | 00:11:22:33:FF | COLLATE / STAPLE / BOOKBINDING ( BUNDLE, PACKAGE ) / ... | 0.5 |
| Dev-G | 00:11:22:33:GG | SIZING/CUTTING ( ONE SIDE, THREE SIDES ) / ... | 10 |
| .. | : | : | |
| Dev-X | 00:11:22:33:XX | CUTTING ( ONE SIDE, THREE SIDES ) / ... | 1 |
| Dev-Y | 00:11:22:33:YY | PACKAGING / ... | 0.2 |

FIG. 25

| NAME | ENVIRONMENT | PERFORMANCE |
|---|---|---|
| ENVIRONMENT-01 | Dev-E<br>+Dev-F<br>+Dev-X<br>+Dev-Y | MONOCHROME / 10 ppm / MAX-A3 / TWO SIDES<br>/ COLLATE / STAPLE<br>/ BOOKBINDING ( BUNDLE, PACKAGE )<br>/ CUTTING / PACKAGING / ... | ... |
| ENVIRONMENT-02 | Dev-A<br>+Dev-F<br>+Dev-X<br>+Dev-Y | COLOR / 30 ppm / MAX-A3 / TWO SIDES<br>/ PUNCH / COLLATE / STAPLE<br>/ BOOKBINDING ( BUNDLE, PACKAGE )<br>/ CUTTING / PACKAGING / ... | ... |
| ENVIRONMENT-03 | Dev-C<br>+Dev-X<br>+Dev-Y | MONOCHROME / 100 ppm / MAX-A4 / TWO SIDES<br>/ BOOKBINDING ( BUNDLE, PACKAGE ) / Z-FOLDING<br>/ CUTTING / PACKAGING / ... | ... |
| ENVIRONMENT-04 | Dev-A<br>+Dev-E<br>+Dev-F<br>+Dev-X ... | MONOCHROME / 30 ppm + 10 ppm / MAX-A3 / TWO SIDES<br>/ PUNCH / COLLATE / STAPLE<br>/ BOOKBINDING ( BUNDLE, PACKAGE )<br>/ INSERT ( COVER, SLIP SHEET, TAB SHEET ) / ... | |
| ENVIRONMENT-05 | Dev-B<br>+Dev-D<br>+Dev-G<br>+Dev-X | COLOR + MONOCHROME / 20 ppm + 50 ppm / MAX-A3<br>/ TWO SIDES<br>/ BOOKBINDING ( BUNDLE, PACKAGE ) / Z-FOLDING<br>/ SIZING / CUTTING ( ONE SIDE, THREE SIDES )<br>/ INSERT ( COVER, SLIP SHEET, TAB SHEET ) | ... |
| ... | ... | | |

FIG. 26

| NAME | PROCESS FLOW |
|---|---|
| ENVIRONMENT -01 | ¥¥PRE-PROCESS : <br> [ POWER ON Dev-E, AND CONFIRM AND REPLENISH EXPANDABLE ] / [ POWER ON Dev-F, REMOVE STACK, AND CONFIRM AND REPLENISH EXPANDABLE ] <br> ¥¥PROCESS FLOW 01 : <br> [ CLICK "PRINTING START" BUTTON OF PROCESS FLOW STATUS DIALOG ] <br> /.../ [MOVE PRINTED MATERIAL OF Dev-E TO COLLATE BIN OF Dev-F, AND CLICK "COLLATE" BUTTON ] /.../ [ MOVE PRINTED MATERIAL OF Dev-F TO PEDESTAL OF Dev-X, AND CLICK "CUT" BUTTON ] / [ MOVE PRINTED MATERIAL OF Dev-Y, AND CLICK "PACKAGE" BUTTON ] TO BELT CONVEYOR OF Dev-Y, AND CLICK "PACKAGE" BUTTON ] |
| ... ... ... | ... ... ... |
| ENVIRONMENT -10 | ¥¥PRE-PROCESS : <br> [ POWER ON Dev-B, AND CONFIRM AND REPLENISH EXPANDABLE ] / [ PERFORM PRINTING ADJUSTMENT ( MISREGISTRATION AND CALIBRATION ) OF Dev-B ] / [ POWER ON Dev-D, REMOVE STACK, AND CONFIRM AND REPLENISH EXPANDABLE ] / [ POWER ON Dev-F, REMOVE STACK, AND CONFIRM AND REPLENISH EXPANDABLE ] / [ POWER ON Dev-X, AND CONFIRM AND REMOVE CUTTING DUST ] <br> ¥¥PROCESS FLOW 01 : <br> [ CLICK "PRINTING START" BUTTON OF PROCESS FLOW STATUS DIALOG ] / [ PRINT COLOR ORIGINAL PAGE BY Dev-B ] /.../ [ MOVE PRINTED MATERIAL OF Dev-B TO COLLATE BIN OF Dev-F ] / [ CONFIRM, ADJUST, AND CORRECT IMAGE QUALITY OF PRINTED MATERIAL ] <br> ¥¥PROCESS FLOW 02 : <br> [ PRINT MONOCHROME ORIGINAL PAGE BY Dev-D ] /.../ [ MOVE PRINTED MATERIAL OF Dev-D TO COLLATE BIN OF Dev-F ] |
| ... ... ... | ... ... ... |

FIG. 31

| JOB NAME | EVENT NOTIFICATION DESTINATION ADDRESS |
|---|---|
| File-A | 00:11:22:33:AA |
| File-B | 00:11:22:33:BB |
| File-C | 00:11:22:33:CC |
| File-D | 00:11:22:33:DD |
| : | : |

PRINTING CONTROL APPARATUS AND PRINTING CONTROL METHOD

FIELD OF THE INVENTION

The present invention relates to a printing control apparatus and printing control method and, more particularly, to a printing control apparatus and printing control method for properly selecting a plurality of printing devices and controlling a printing process.

BACKGROUND OF THE INVENTION

In recent years, a service called on-demand printing has received a great deal of attention in the field of printing services and printing devices such as a digital copying apparatus and printer. On-demand printing is not a conventional service such as printing or bookbinding which assumes a large number of printed materials at a print shop, but a service of providing a small number of simple printed materials or booklets within a short time.

When an original to be processed by on-demand printing contains both color and monochrome pages, the operator divides the original into pages using a color copying (or printer) apparatus and pages using a monochrome copying (or printer) apparatus. After color and monochrome pages are printed, the operator rearranges the printed materials in page order, and binds them off-line by a stapler or the like.

At a copying shop or the like, work is complicated because of requests from a plurality of customers. In order to quickly perform work from designation of an output destination to bookbinding, a high-performance apparatus connected to a plurality of options or many copying apparatuses must be used, or an experienced operator must efficiently distribute pages to apparatuses.

If, however, an experience operator is absent or the user is to print and bind an original containing both color and monochrome pages at an office or the like, the user cannot determine the type and method of color copying apparatus and those of monochrome copying apparatus in order to achieve efficient work, taking a longer time than expected.

Also, an optimal copying apparatus changes depending on the stapling or bookbinding mode or the number of outputs. Even if the copying apparatus has a bookbinding function, the user cannot fully exploit it, and may have to manually bind output results.

An optimal copying apparatus may be automatically selected (for example, a high-performance color copying apparatus (printer) is selected for outputting a color original and a high-speed monochrome copying apparatus (printer) is selected for a monochrome original). Even in this case, if an apparatus arranged apart from the user is selected, an extra process time is taken.

For a large number of pages of a color & monochrome job or a large number of printed-materials (copies), th user must wait till the end of outputting each color or monochrome job near an output copying apparatus.

When different booklets must be parallel-printed at a copying shop or the like, the process order must be recorded on paper. The occurrence of a plurality of work processes makes the booklet work procedures cumbersome.

Bookbinding of one booklet via various divisional processes in the presence of different paper sheets in one job, the coexistence of color and monochrome originals, or both cover printing and bookbinding requires printers, copying apparatuses, collators, and bookbinding apparatuses. It is very difficult for an operator other than an experienced operator to process bookbinding by using these apparatuses simultaneously. As a result, the operator must perform steps one by one inefficiently for a long process time.

When one job is processed using a plurality of printers, the operator may fail to pick up a page processed by a given printer and omit it.

A shortage of an expandable such as toner or sheets immediately after the start of output leads to wasteful work such as re-setting or replenishment of the expandable or the like.

In this manner, an output destination is conventionally selected from a plurality of candidates depending on the subjectivity or knowledge of the user who executes printing. The efficiency varies depending on the user, and no mechanism which supports complicated work exists. Under the circumstance, an output destination determination system which automatically determines an output destination by selecting the printing cost per output sheet, the output time, positional information of the printer, or the like is recently examined.

For example, to output a file containing both color and monochrome pages with cost priority, it is preferable to output color pages by a color printer and monochrome pages by a monochrome printer. However, a conventional output destination determination system cannot realize such distribution even if cost priority is designated.

For the user, the efficiency will be further increased by a system which automatically searches for one or a plurality of output destinations under a plurality of conditions. However, such technique has not been available yet.

In the presence of a plurality of candidates as a result of search, if the user can select an output from the candidates, the user operability will improve.

The present invention has been made to overcome the conventional drawbacks: and has as its object to provide a printing control apparatus and printing control method capable of allowing even an inexperienced operator to efficiently perform a desired printing process by using proper printing devices.

It is more preferable to be able to automatically detect a proper printing device on the basis of the final output form desired by the user and output file information.

SUMMARY OF THE INVENTION

According to an aspect of the present invention, a printing control apparatus which performs a printing process employing a plurality of printing devices, comprising: printing attribute acquisition means for acquiring an attribute of a printing job to be processed; adaptive environment determination means for obtaining device combinations capable of executing the printing job based on performance information representing at least performance of each of the plurality of printing devices and the acquired attribute of the printing job; and process flow presentation means for presenting process procedures of the printing process by a combination actually used to execute the printing job out of the device combinations.

According to another aspect of the present invention, a printing control method for performing a printing process employing a plurality of printing devices, comprising: a printing attribute acquisition step of acquiring an attribute of a printing job to be processed; an adaptive environment determination step of obtaining device combinations capable of executing the printing job based on performance information representing at least performance of each of the plurality of printing devices and the acquired attribute of the printing job; and a process flow presentation step of presenting process procedures of the printing process by a combination actually used to execute the printing job out of the device combinations.

According to yet another aspect of the present invention, a computer-readable medium storing program code for causing a computer to execute a method for controlling a printing process employing a plurality of printing devices, comprising: a printing attribute acquisition step of acquiring an attribute of a printing job to be processed; an adaptive environment determination step of obtaining device combinations capable of executing the printing job based on performance information representing at least performance of each of the plurality of printing devices and the acquired attribute of the printing job; and a process flow presentation step of presenting process procedures of the printing process by a combination actually used to execute the printing job out of the device combinations.

According to further aspect of the present invention, a computer program product comprising a computer-readable medium having computer code for controlling a printing process employing a plurality of printing devices, said product comprising: a printing attribute acquisition proc ss procedure code for acquiring an attribute of a printing job to be processed; an adaptive environment determination process procedure code for obtaining device combinations capable of executing the printing job based on performance information representing at least performance of each of the plurality of printing devices and the acquired attribute of the printing job; and a process flow presentation process procedure code for presenting process procedures of the printing process by a combination actually used to execute the printing job out of the device combinations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing an example of the arrangements of a host and MFP according to an embodiment of the present invention;

FIG. 9 is a view showing an example of a printing attribute setting dialog;

FIG. 10 is a view showing another example of the printing attribute setting dialog;

FIGS. 11 to 14 are views showing examples of a layout preview dialog displayed by the host serving as the printing control apparatus according to the embodiment of the present invention;

FIGS. 15 to 18 are views showing examples of an output form preview dialog displayed by the host according to the embodiment of the present invention;

FIGS. 19 and 20 are tables showing examples of a printing attribute information table displayed by the host according to the embodiment of the present invention;

FIGS. 21 and 22 are tables showing examples of a device information table used in the host according to the embodiment of the present invention;

FIG. 25 is a table showing an example of an adaptive environment table generated by the host according to the embodiment of the present invention;

FIG. 26 is a table showing an example of a process flow table generated by the host according to the embodiment of the present invention;

FIG. 31 is a table showing an example of an event notification destination address table generated by the host according to the embodiment of the present invention;

DETAILED DESCRIPTION OF THE PREFERRED EMBODIMENTS

Preferred embodiments of the present invention will now be described in detail in accordance with the accompanying drawings.

■(System Configuration)

Figure 5:
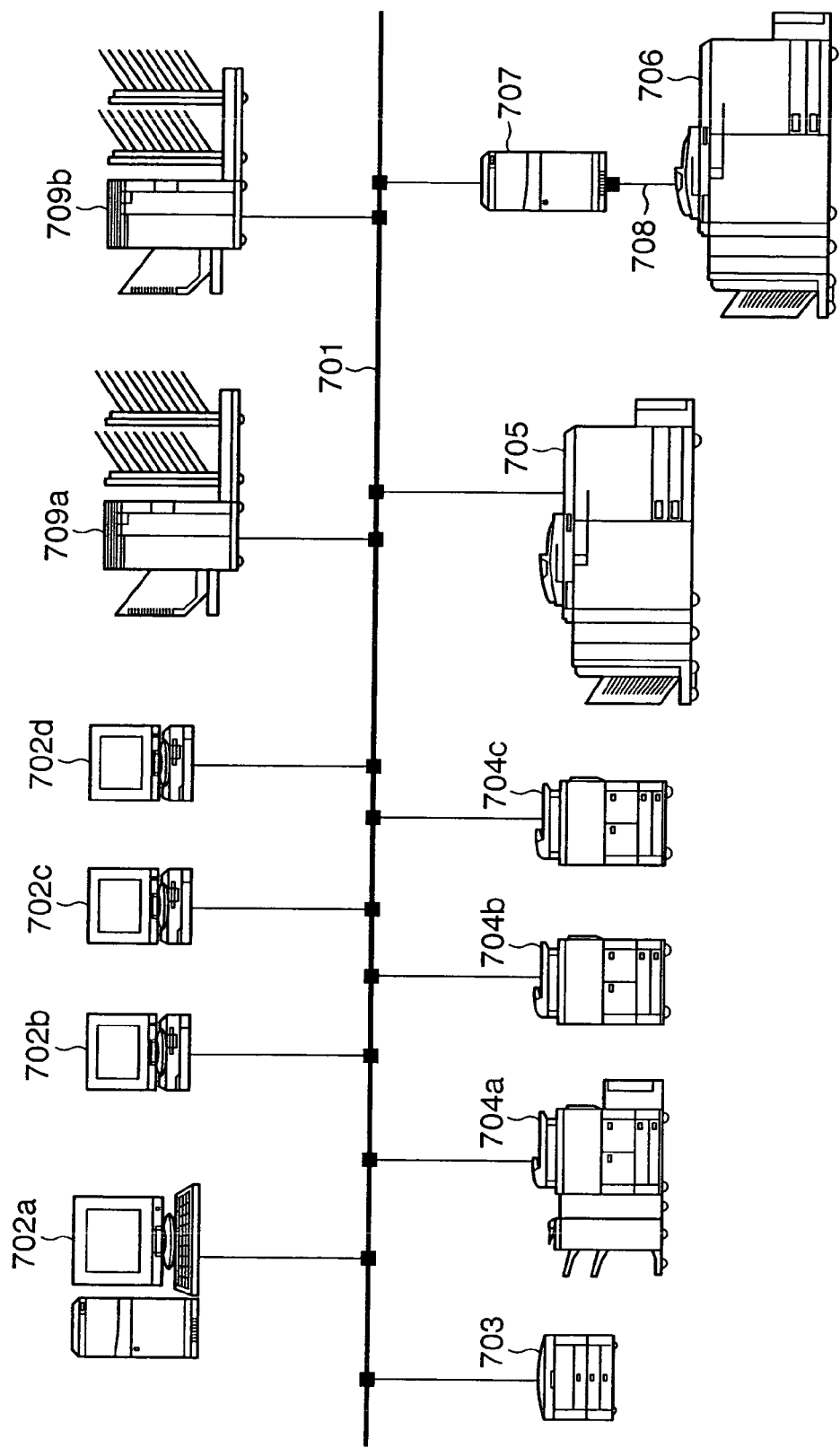
FIG. 5 is a view showing an example of a computer network system to which a printing control apparatus according to the present invention can be applied.

FIG. 5 is a view showing an example of the overall configuration of a computer network system to which a printing control apparatus according to the present invention can be applied.

In FIG. 5, a computer 702a out of computers (702a to 702d) which are connected to a network (701) and can function as the printing control apparatus according to the present invention is a printer server, and the computers 702b to 702d are clients. Although not shown, many other clients are connected. When any one of the server 702 and clients 702b to 702d is referred to without particularly specifying it, it will be called a host (702).

A monochrome printer (703), monochrome MFPs (Multi Function Peripherals) (704a, 704b, and 704c), and color MFPs (705 and 706) are further connected to the network (701). Although not shown, other devices such as a printer, MFP, scanner, and FAX are also connected.

Application software which executes so-called DTP (Desk Top Publishing) runs in the host (702) to create and edit various documents and graphics. The created/edited document/graphic is converted into PDL (Page Description Language), and directly printed out by the printer (703) or MFP (704 to 706) via the network (701), or printed by the printer (703) or MFP (704 to 706) via the server (702a).

The monochrome MFPs (704a, 704b, and 704c) can also read and print monochrome image data, and can also be used as simple low-resolution binary color scanners. The color MFPs (705 and 706) can read and print image data at high resolution and high grayscale quality. The color MFP can receive data directly from the network (701) and internally map the data into an output image, like the color MFP (705), or can receive and output via a dedicated cable (708) an output image mapped by a print controller (707), like the color MFP (706).

Various devices (703 to 706) including the MFPs have communication devices capable of exchanging information with the host (702) via the network (701), and can notify the host (702) of pieces of information and the states of the devices (703 to 706). The host (702) has utility software which runs in accordance with notified information, and can manage the devices (703 to 706).

Collators (709a and 709b) are connected to the network (701), and the host (702) can control the collators (709a and 709b) via the network (701) or directly control each collator by using a collator operation unit (not shown). For example, the user picks up print d sheets from the color MFP (706) and monochrome MFP (704b), and sets them in the collator (709a). The collator then collates color and monochrome pages, and the user can obtain output results sorted in page order.

■(Structure of Color MFP)

Figure 6:
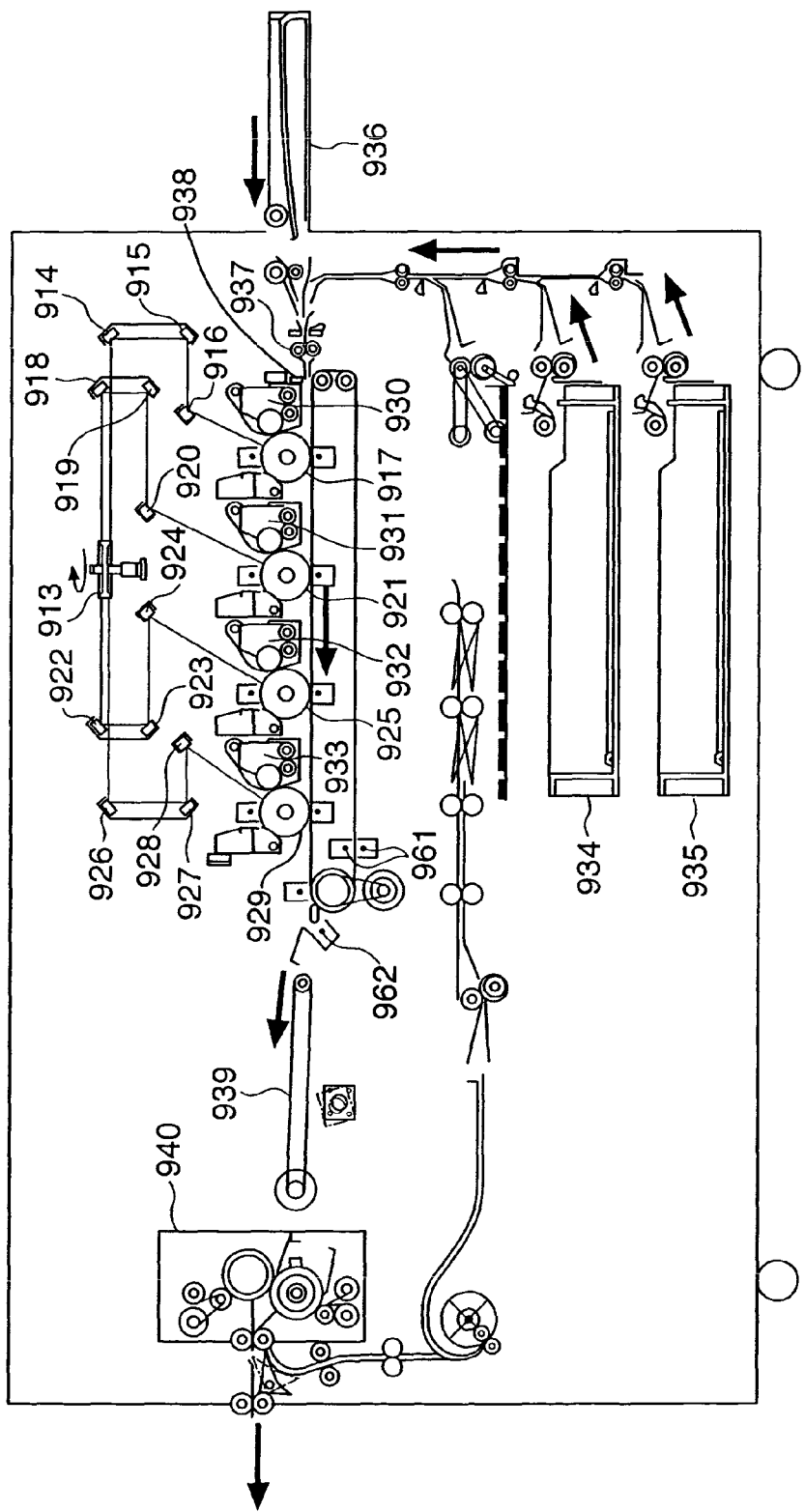
FIG. 6 is a longitudinal sectional view showing an example of the arrangement of a color MFP which can be used as a device in the embodiment of the present invention.

FIG. 6 is a sectional view showing an example of the arrangement of the color MFP (705 or 706).

A laser source (not shown) is ON/OFF-controlled by an image signal which is mapped inside the MFP (705) or by the print controller (707) and decomposed into Y, M, C, and K color components. The laser source is caused to output a laser beam corresponding to the image signal. The laser beam is reflected by a polygon mirror (913) to scan different photosensitive drums for respective color components. More specifically, the first laser beam scans a photosensitive drum (917) via mirrors (914, 915, and 916). The second laser beam scans a photosensitive drum (921) via mirrors (918, 919, and 920). The third laser beam scans a photosensitive drum (925) via mirrors (922, 923, and 924). The fourth laser beam scans a photosensitive drum (929) via mirrors (926, 927, and 928). As a result, an electrostatic latent image corresponding to the image signal is formed on each photosensitive drum.

The photosensitive drums (917, 921, 925, and 929) have corresponding developing units (930, 931, 932, and 933), and electrostatic latent images on the photosensitive drums are visualized by color toners in the developing units. The color components of the image signal which forms the electrostatic latent images and the colors of the developing agents of the developing units (930 to 933) are made to coincide with each other, thereby generating yellow (Y), magenta (M), cyan (C), and black (K) toner images.

The color MFP comprises a plurality of sheet cassettes (FIG. 6 shows only the first and second sheet cassettes 934 and 935) and a manual feed tray (936). A printing sheet fed from either sheet cassette (934 or 935) or the feed tray (936) reaches a registration roller (937), and rotation of the photosensitive drums (917, 921, 925, and 929) and the feed timing are synchronized. Toner images in the four colors (Y, M, C, and K) formed on the photosensitive drums are sequentially transferred onto the printing sheet which is chucked and conveyed by a transfer belt (938).

The printing sheet conveyed on the transfer belt (938) is separated at a separation portion (962). The toner is fixed onto the printing sheet by a fixing unit (940) via a convey belt (939), thus discharging the printing sheet outside the MFP.

■(Arrangement of Monochrome MFP)

Figure 7:
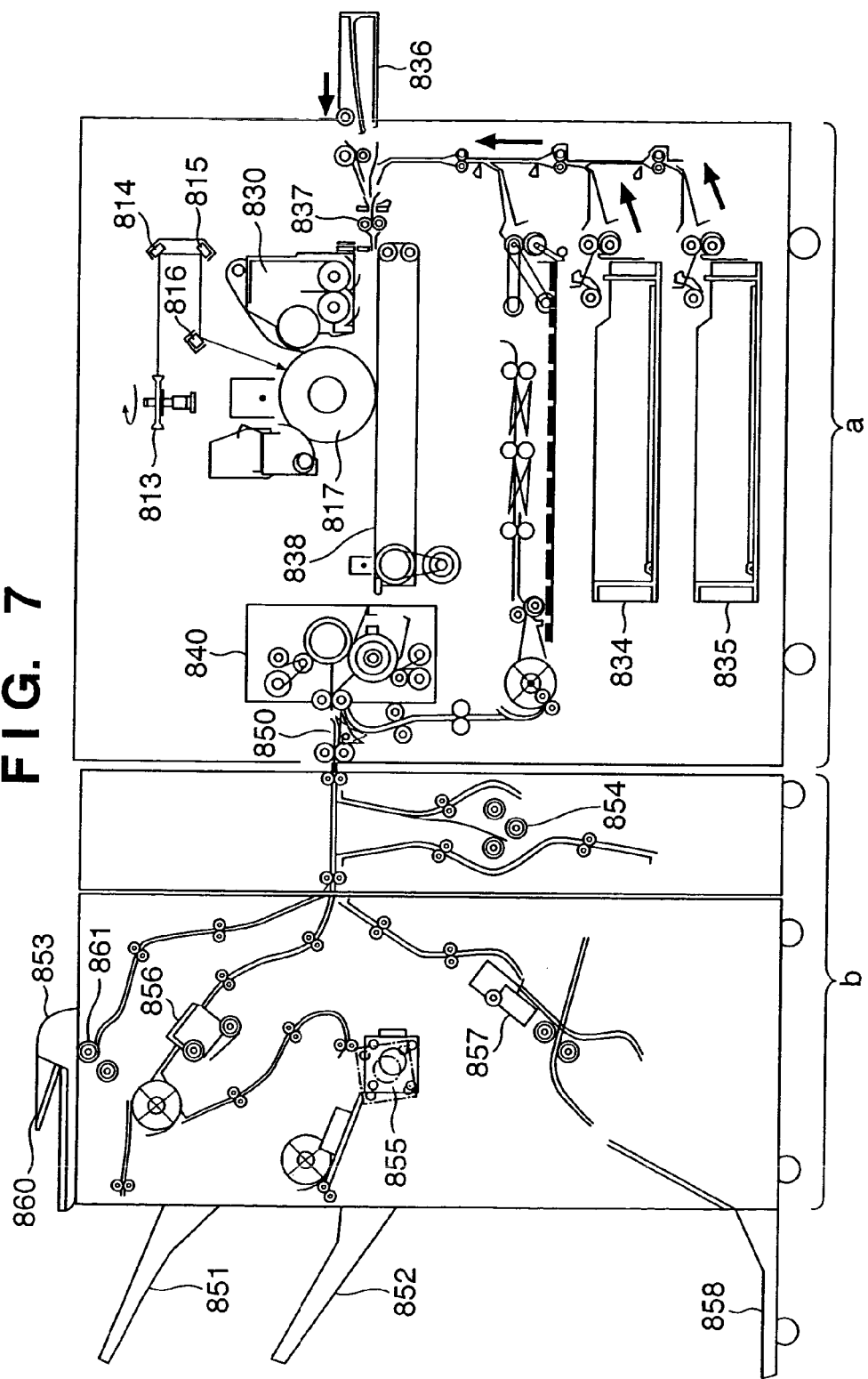
FIG. 7 is a longitudinal sectional view showing an example of the arrangements of a monochrome MFP and finishing device which can be used as devices in the embodiment of the present invention.

FIG. 7 is a sectional view showing an example of the arrangement of the monochrome MFP (704a, 704b, or 704c). FIG. 7 shows an example of the arrangement of the MFP (704a) in which a main body part a is equipped with a finishing device b. The arrangement of the main body part a also applies to the MFPs 704b and 704c.

Image data received as PDL (Printer (or Page) Description Language) by the MFP (704a) is used to modulate a laser beam,. The laser beam is reflected by a polygon mirror (813) to scan a photosensitive drum (817) via mirrors (814, 815, and 816). A black developing unit (830) forms a toner image on the photosensitive drum (817) in accordance with the scanned laser beam.

Similar to the color MFP, the monochrome MFP (704) also comprises a plurality of sheet cassettes (first and second sheet cassettes 834 and 835) and a manual feed tray (836). A printing sheet fed from either sheet cassette (834 or 835) or the feed tray (836) reaches a registration roller (837), and the photosensitive drum (817) and the feed timing are synchronized. The black toner image formed on the photosensitive drum (817) is transferred onto the printing sheet conveyed by a transfer belt (838). The toner image is fixed onto the printing sheet by a fixing unit (840). The printing sheet discharged from the fixing unit (840) is temporarily guided down by a flapper (850), and after the trailing end of the printing sheet passes through the flapper (850), switched back and discharged. Accordingly, the printing sheet is discharged facedown. When an original is Printed sequentially from the first page, printing sheets are sorted in a correct page order.

A printing sheet discharged from the main body part a of the MFP (704a) is supplied to the finish r part b. The finisher part comprises two delivery trays (sample tray 851 and stacking tray 852). The sample tray (851) and stacking tray (852) are switched for discharge in accordance with the type of job and the number of printing sheets to be discharged. When printing sheets are to be discharged onto the stacking tray (852), they can be stocked before discharge for each job and bound by a stapler (855) immediately before discharge. A Z-folding mechanism (854) for folding a sheet into a Z shape and a puncher (856) for punching printing sheets for filing are arranged up to the delivery trays (851 and 852), and perform corresponding processes in accordance with the type of job. A saddle stitcher (857) binds printing sheets at two central portions, pinches the center of the printing sheets between rollers, and folds them into two, thereby forming a booklet such as a magazine or brochure. The printing sheets bound by the saddle stitcher (857) are discharged onto a booklet tray (858).

An inserter (853) supplies a printing sheet set on a feed tray (860) to any discharge tray (851, 852, and 858) without feeding it to the printer. A printing sheet set on the inserter (853) can be inserted (separation) between printing sheets supplied to the finisher part. The feed tray (860) of the inserter (853) is set faceup by the user, and printing sheets are fed by a pickup roller (861) sequentially from the top. A printing sheet from the inserter (853) is directly conveyed to the delivery tray (851 or 852) and discharged facedown. When a printing sheet is to be fed to the saddle stitcher (857), it is fed once to the puncher (856), then switched back, and fed, thereby aligning the face direction.

Although not shown, if necessary, the finisher part b can also be equipped with a binding function using glue for bookbinding and a trimming (cutting) function of aligning end faces on a bound side and opposite side after binding.

FIG. 1 is a block diagram showing an example of the control arrangements of the host (702) and MFP (704 to 706) serving as a device. The host (702) and MFP (704 to 706) can communicate with each other via the network 701 and a connection unit 1020 (2020). The connection unit is a network interface when the network 701 is a computer network as shown in FIG. 5, and a serial or parallel interface for a local connection.

A memory unit 1030 (2030) comprises various memories, stores software and data executed by the connection unit 1020 (2020), and is also used as a work area for a control unit. FIG. 1 shows disk devices such as a RAM, ROM, and HDD, and an arbitrary memory commercially available as a memory such as an optical disk can be utilized.

A display unit 1040 of the host (702) is a display device such as a CRT monitor or LCD, and displays the GUI of an OS, application, or the like running on the host. An input unit 1070 is an input device for giving an instruction to the host (702) or inputting a character or th like, and is comprised of a keyboard, mouse, track ball, and the like. A medium reading unit 1050 is a drive device corresponding to a so-called removable memory medium (flexible disk, memory card, or optical (magnetic) disk).

A printing unit 2040 in the MFP (704 to 706) is a print engine based on an arbitrary method such as electrophotography, inkjet method, or thermal transfer method. In general, a large-size MFP adopts an electrophotographic print engine.

A reading unit 2050 is a so-called scanner device which reads an original image and converts it into a digital signal. An operation unit 2060 has a key, button, display device, and the like, and functions as an MFP state display device and user interface.

The disk device such as an HDD which is included in the memory unit (1030) of the host (702) in FIG. 1 stores a software module which realizes control according to the present invention. When the host (702) is activated, the software module is loaded to the RAM of the memory unit (1030) and executed.

Figure 32:
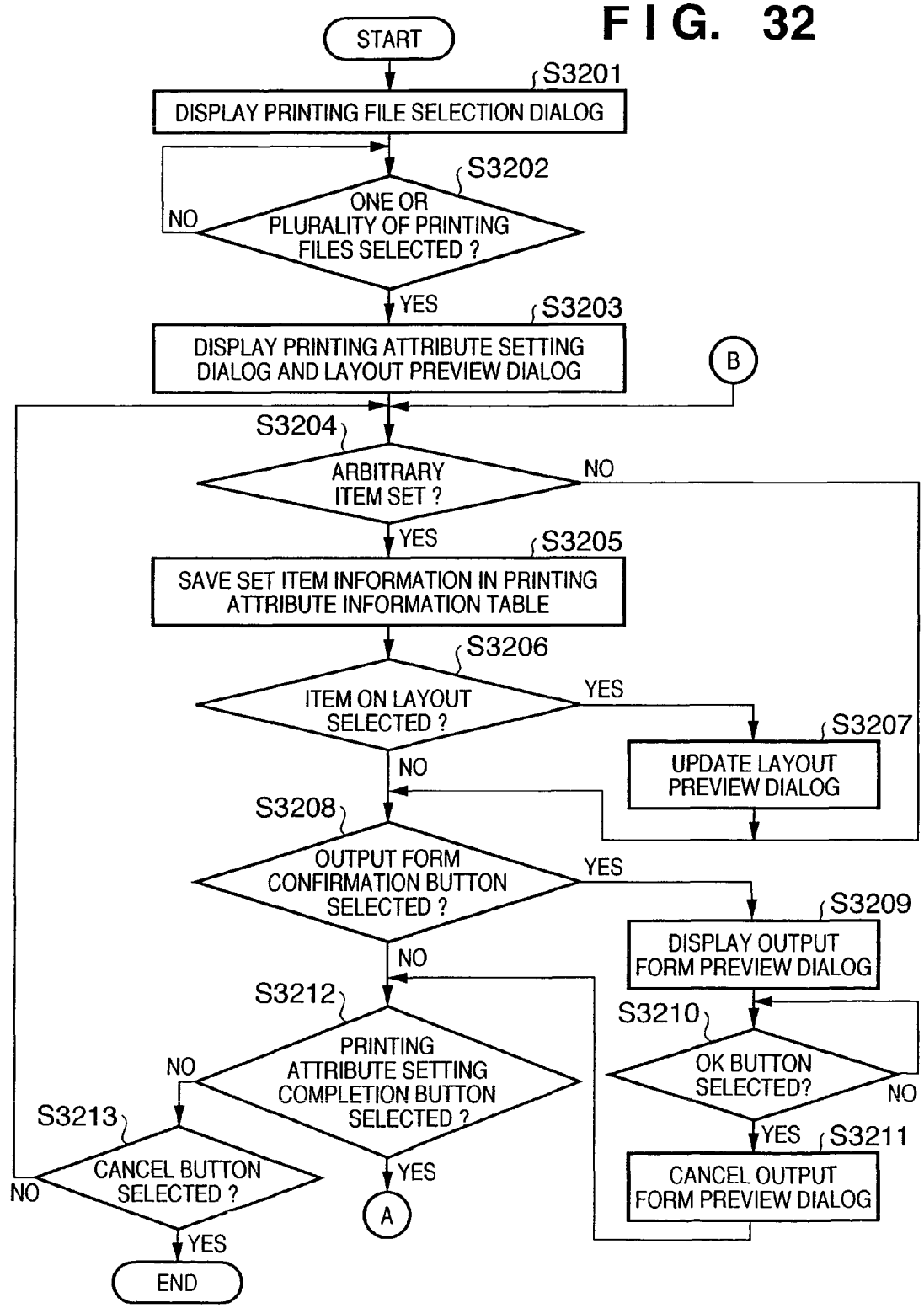
FIGS. 32 to 34 are flow charts for explaining a host process according to the embodiment of the present invention.
Figure 33:
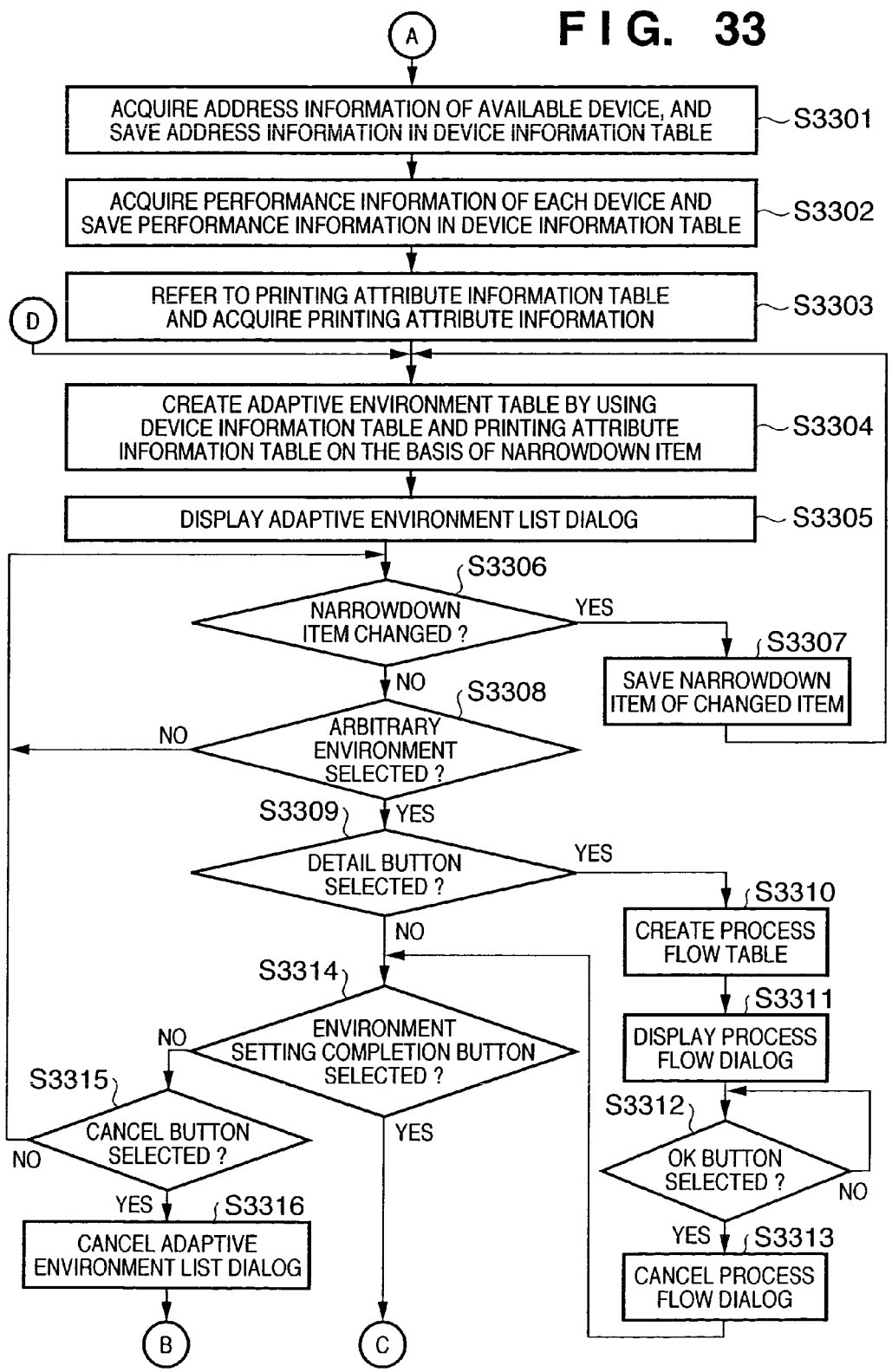
Figure 34:
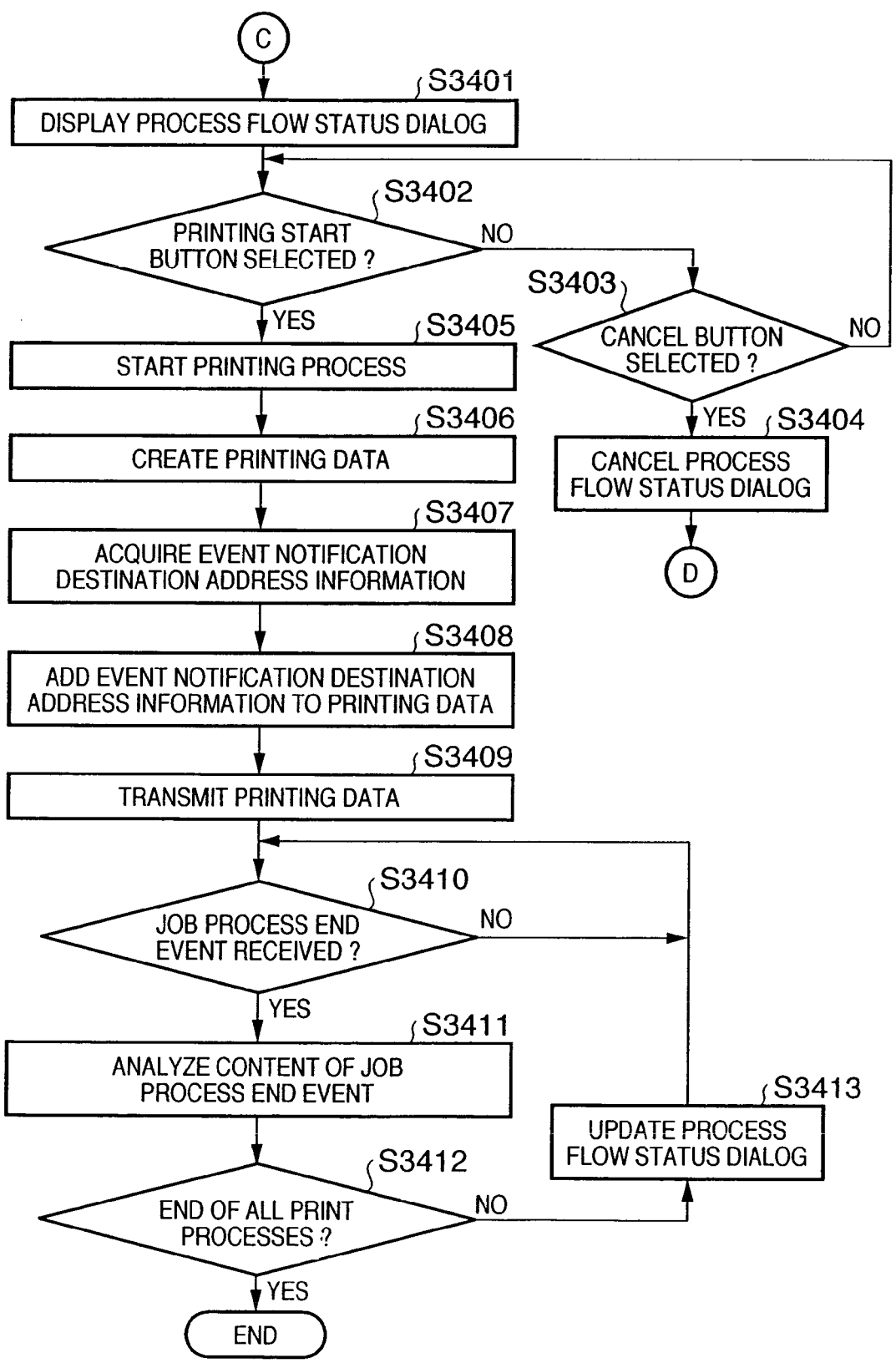
Figure 35:
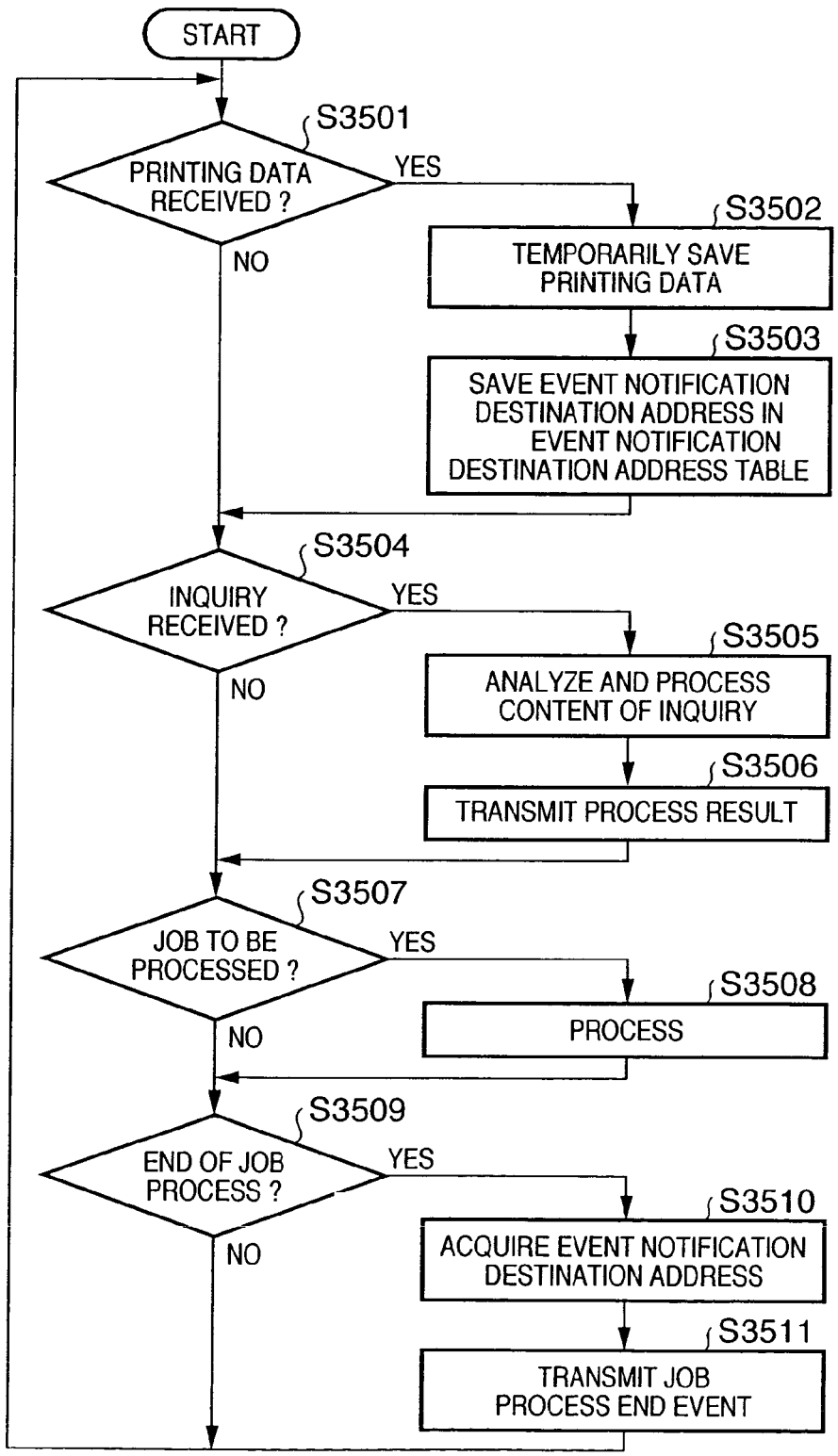
FIG. 35 is a flow chart for explaining a device process according to the embodiment of the present invention.

In the following description, of software modules which perform processes described in the flow charts of FIGS. 32, 33, 34, and 35 to be described later, modules corresponding to the processes of FIGS. 32, 33, and 34 are stored in the host (702), and a-module corresponding to the process of FIG. 35 is stored in a device in FIG. 5.

The disk device of the memory unit (1030) of the host (702) in FIG. 5 stores a plurality of printing files to be output in the system, and default value information of a printing attribute information table for each file in a format as shown in FIG. 19. The disk device also stores "cost" as information of the default value of a narrowdown item in the system.

Figure 2:
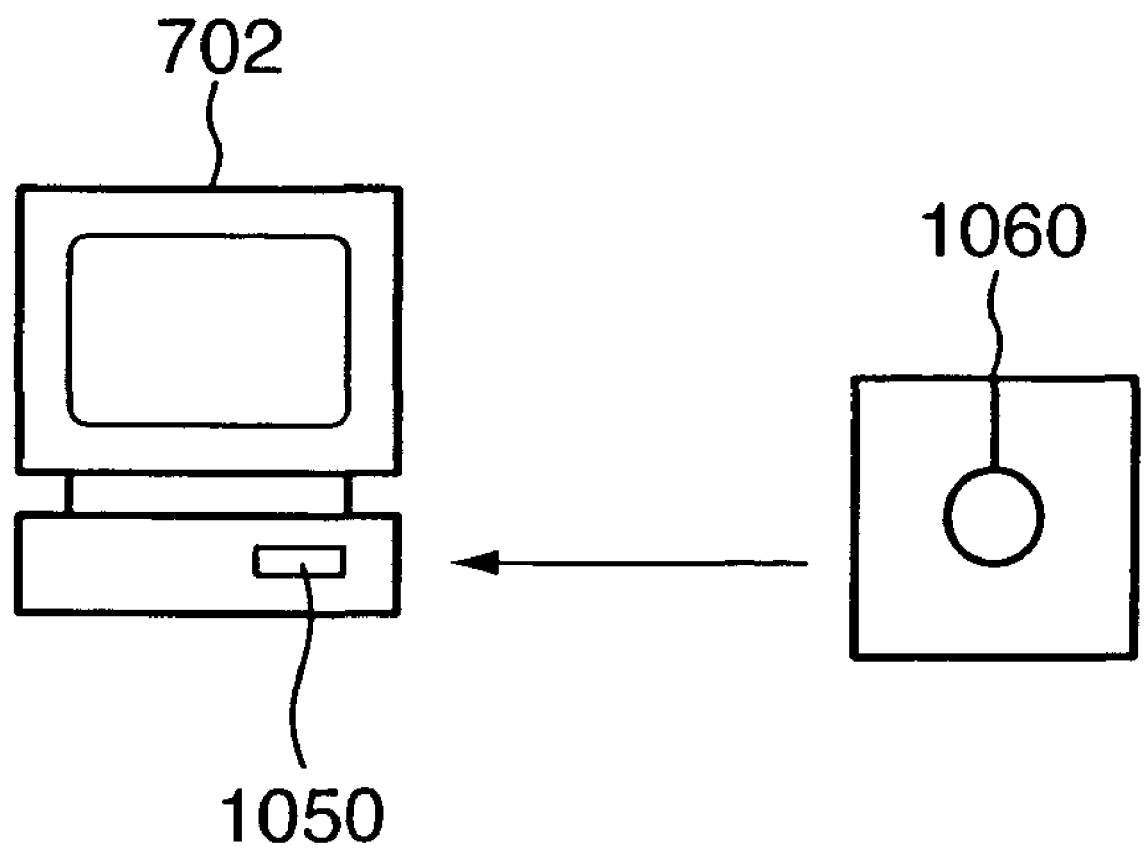
FIG. 2 is a schematic view for explaining an operation of causing the host shown in FIG. 1 to load a software module recorded on a recording medium.
Figure 4:
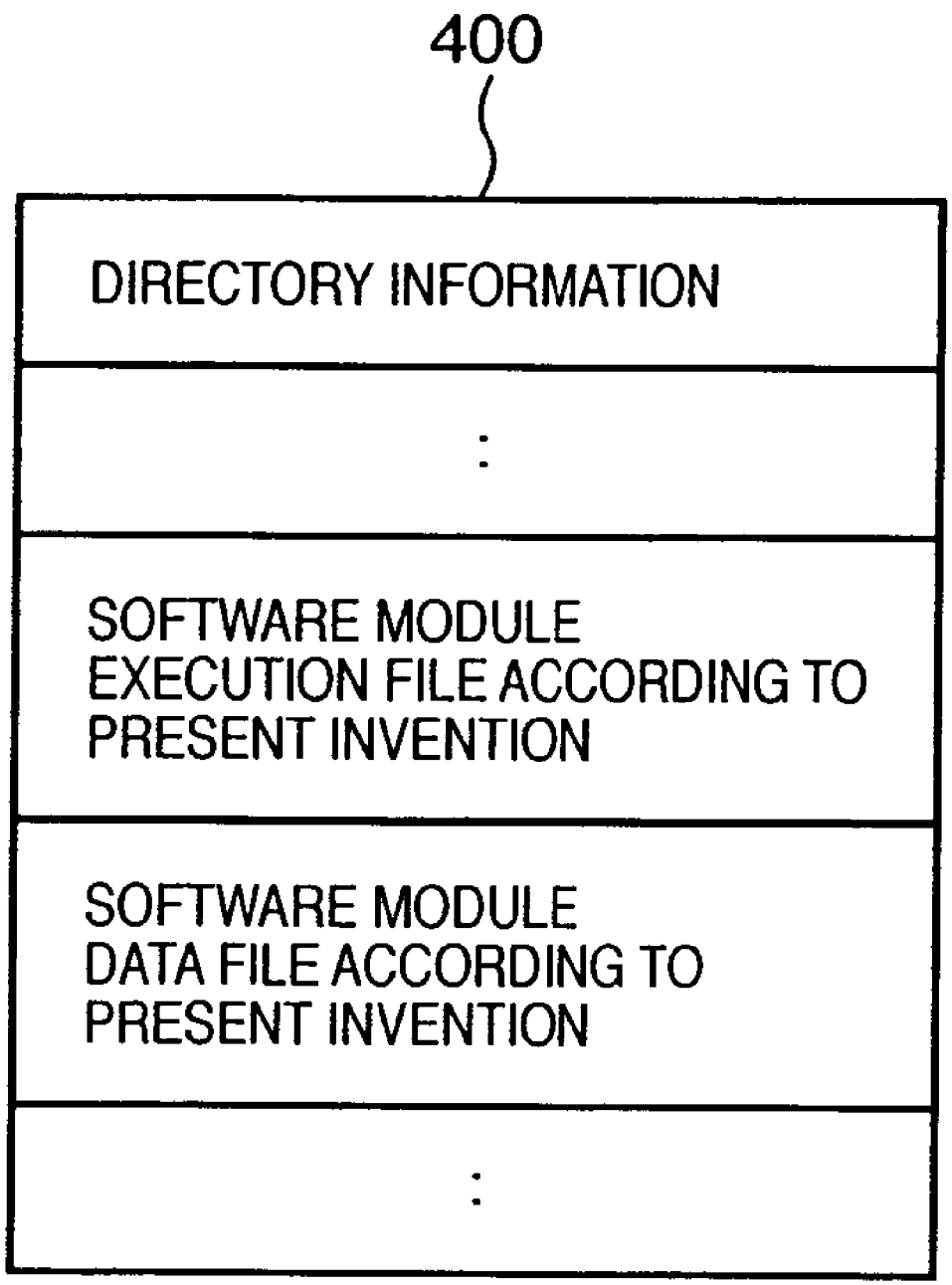
FIG. 4 is a view showing an example of the memory map of a storage medium which stores the software module according to the present invention.

As shown in FIG. 2, a software module and related data recorded on a recording medium (1060) such as an optical disk or magnetic disk can be acquired via the medium reading unit (1050) of the host (702), loaded to the RAM, and executed. FIG. 4 is a view showing the state of a module and related data which are recorded on the recording medium (1060) and implement the present invention. The module and related data can be loaded to the host via the medium reading unit (1050) in FIG. 2. When the recording medium (1060) is set in the medium reading unit (1050) of the host, the module and related data which implement the present invention are read out from the recording medium (1060), and loaded to the RAM of the memory unit (1030) of the host so as to run under the control of an OS and basic I/O (BIOS) program running in the host (702).

Figure 3:
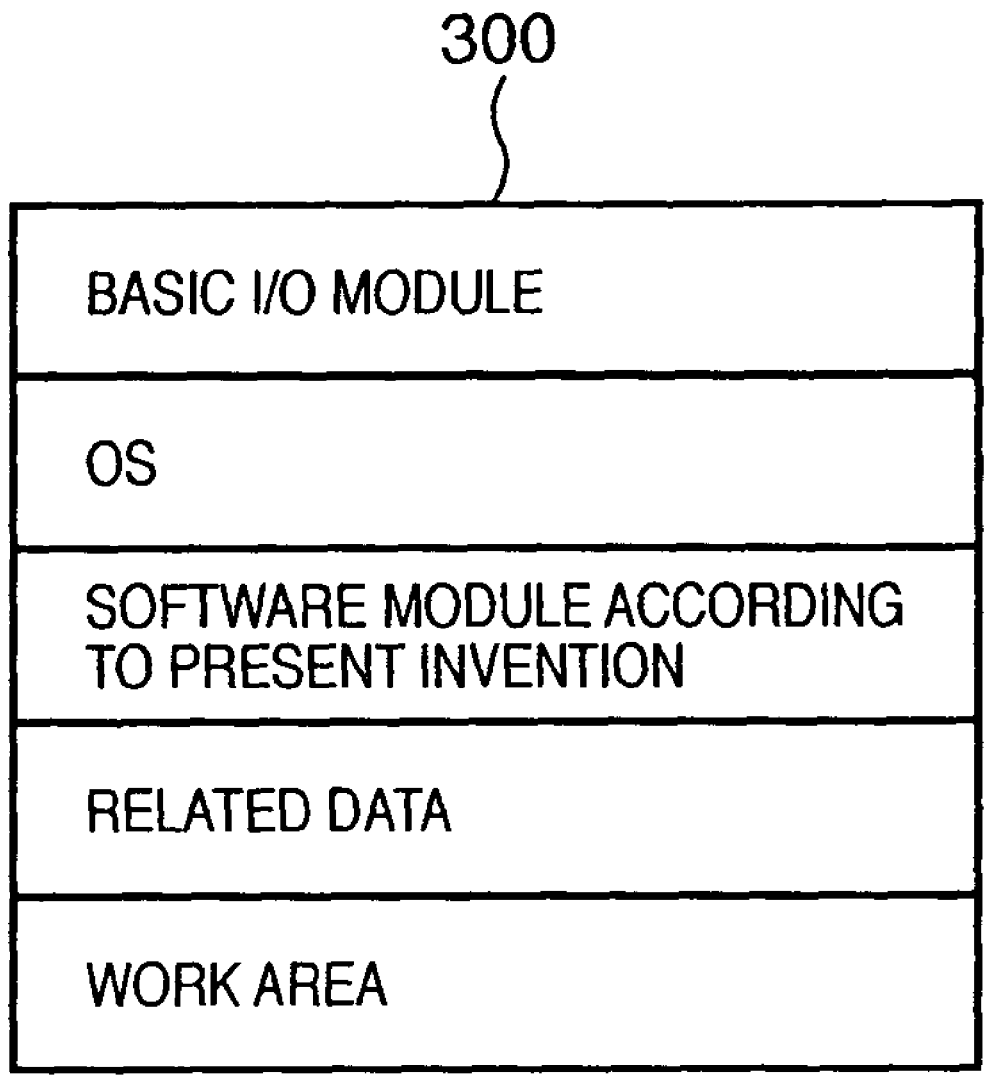
FIG. 3 is a view showing an example of the memory map of the activated host.

FIG. 3 shows a memory map when each software module is loaded to the RAM of the memory unit (1030) of the host so as to run. The module and related data which are recorded on the recording medium (1060) in FIG. 2 and implement control according to the present invention may be temporarily stored (installed) in the disk device of the memory unit (1030) of the host, and a necessary module may be loaded from the disk device or the like to the RAM of the memory unit (1030) of the host in execution.

■(Process by Host 702)

The process flow of the host (702) serving as a printing control apparatus according to the present invention will be explained with reference to FIGS. 32 to 34. Processes described in the flow charts are realized by executing a software module stored in a memory unit such as a ROM or disk device by a control unit (1010) in FIG. 1.

Figure 8:
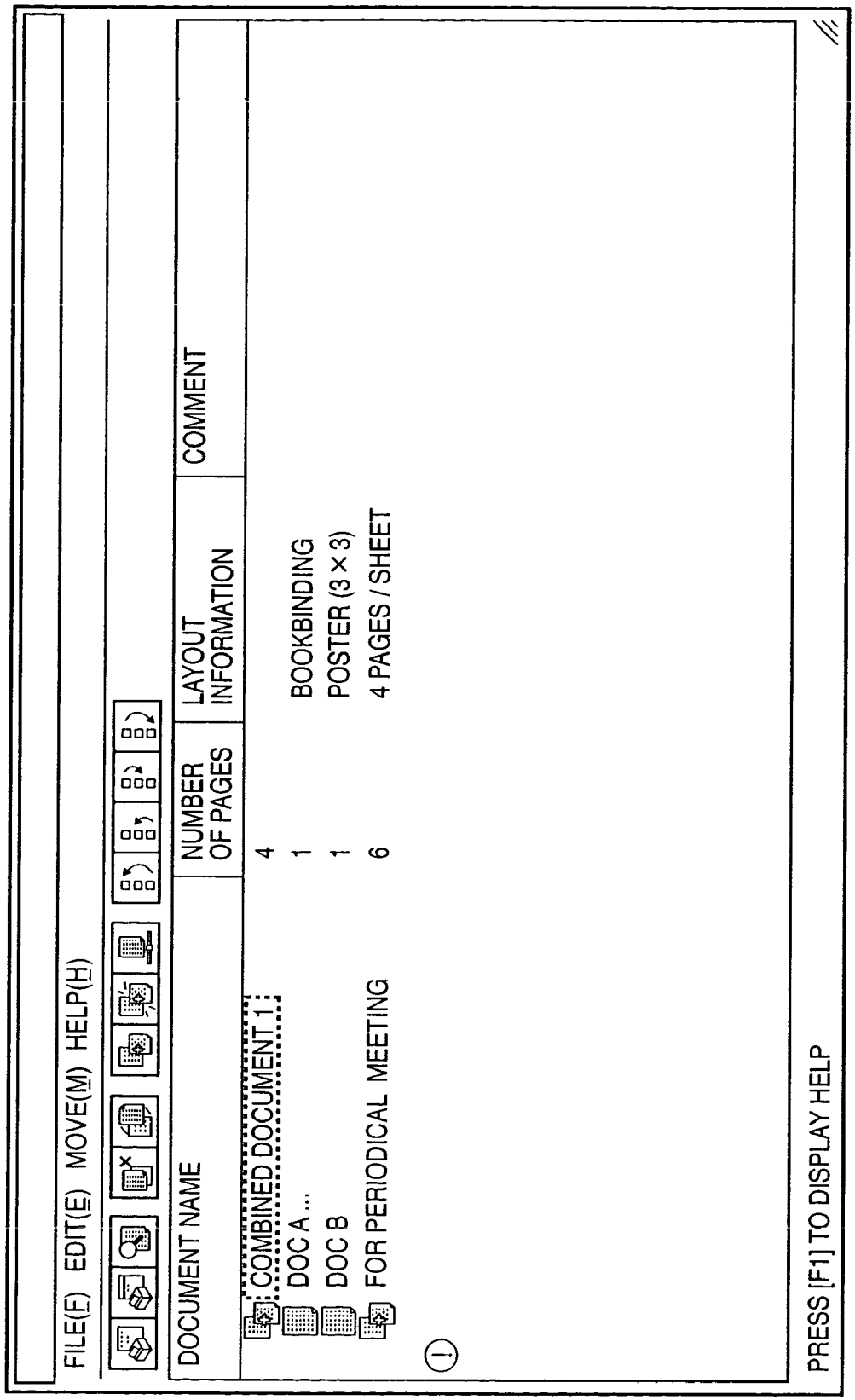
FIG. 8 is a view showing an example of a printing file selection dialog.

If the user activates the host (702), the host (702) displays a printing file selection dialog as shown in FIG. 8 on the display unit (1040) (step S3201). In step S3202, the host (702) waits until the user selects one or a plurality of printing files in the printing file selection dialog of FIG. 8 by using the input unit (1070) having a keyboard, mouse, and the like.

Figure 11:
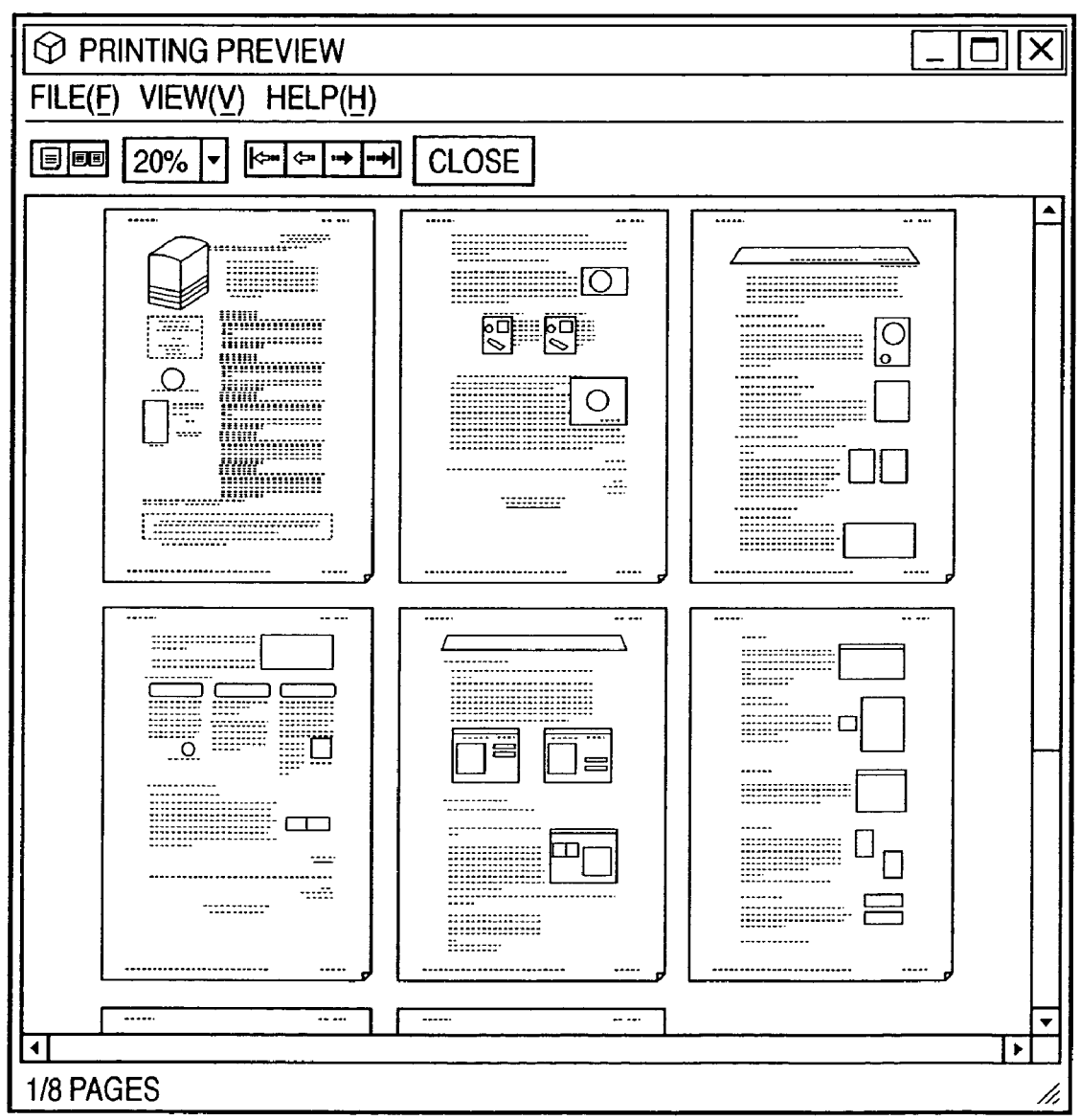

If a printing file is selected, the control unit (1010) displays a printing attribute setting dialog and layout preview dialog as shown in FIGS. 9 and 11 on the display unit (1040) in FIG. 1 (step S3203).

FIG. 9 shows printing attributes set in the printing file selected by the user for respective items. The control unit (1010) refers to the default value of a printing attribute information table as shown in FIG. 19 which is saved in the disk device of the memory unit (1030) in FIG. 1. FIG. 11 shows a preview of printing attributes concerning printing contents and a set layout by referring to the printing file selected by the user and the printing attribute information table of FIG. 19. By displaying the layout preview of FIG. 11, the user can confirm how printing attributes concerning the layout set in the printing attribute setting window are reflected in printing. The user can easily grasp the layout of printing on the two sides of an A4 paper sheet from the printing attributes shown in FIGS. 9 and 11.

The control unit (1010) determines whether any item has been set in the printing attribute setting window at a predetermined timing, e.g., in a predetermined cycle (step S3204).

Figure 15:
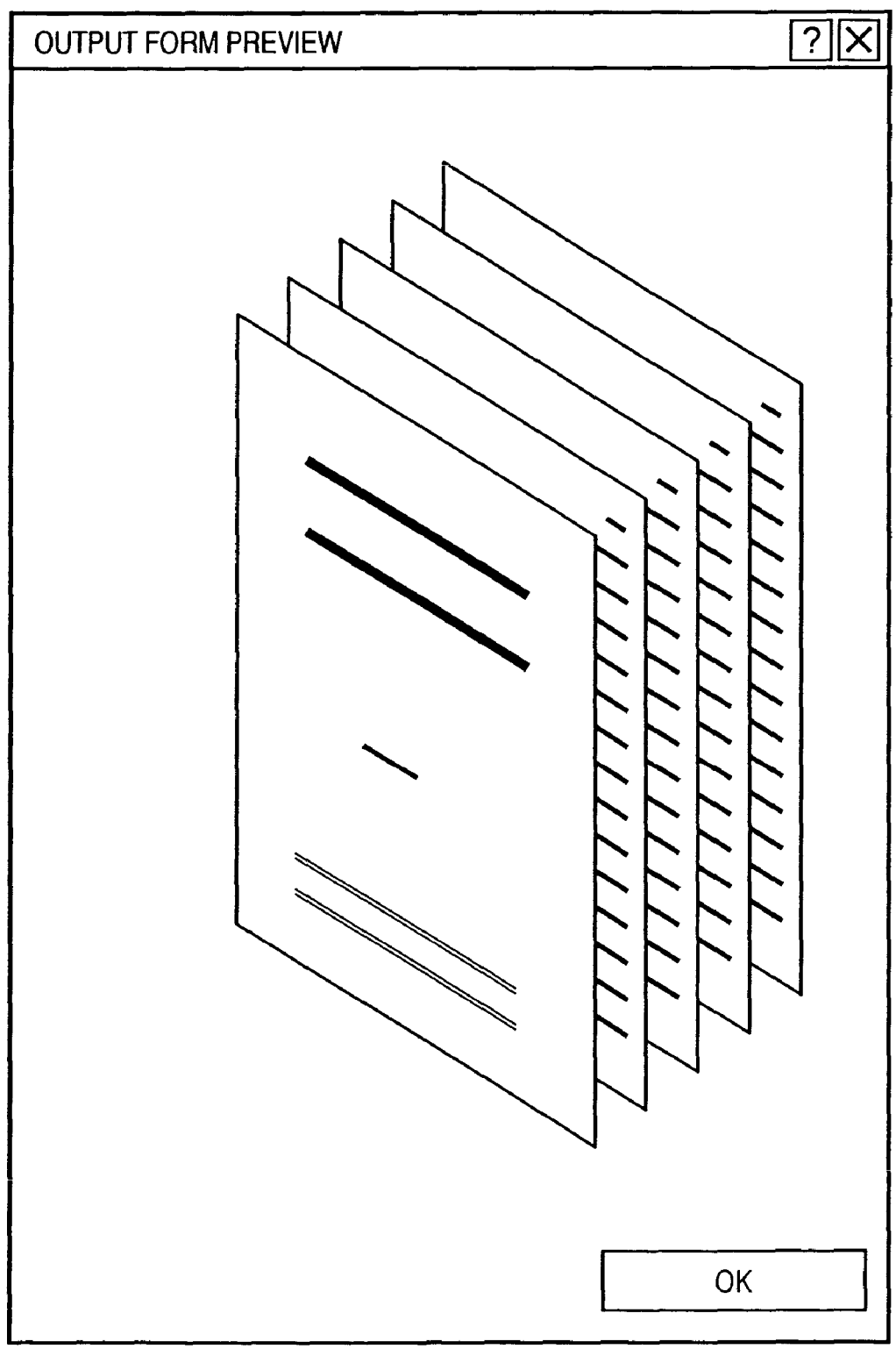

If NO in step S3204, the process advances to step S3208, and the control unit (1010) determines whether an output form confirmation button 91 has been selected (step S3208). If YES in step S3208, the process advances to step S3209, and the control unit (1010) displays an output form preview dialog as shown in FIG. 15 on the display unit (1040) (step S3209). FIG. 15 shows a preview of printing attributes concerning the output form by referring to the printing file selected by the user in the printing file selection dialog and the printing attribute information table of FIG. 19. By referring to the output form preview dialog, the user can confirm how printing attributes set in the output form column of th printing attribute setting window in FIG. 9 are reflected in the printing result.

The control unit (1010) waits until the OK button is selected in the output form preview dialog (step S3210). If the OK button is selected, the process advances to step S3211, and the control unit (1010) cancels the output form preview dialog (step S3211).

The control unit (1010) determines whether a printing attribution setting completion button 93 in the printing attribute setting dialog has been selected with the input unit (1070) (step S3212). In this case, the control unit (1010) determines that the printing attribution setting completion button has not been selected. The process of the control unit (1010) then advances to step S3213. The control unit (1010) determines whether a cancel button 92 in the printing attribute setting dialog has been selected (step S3213). If YES in step S3213, the control unit (1010) ends the printing process; if NO, the process of the control unit (1010) returns to step S3204.

■(Preview Process Upon Designation of Staple)

A process when the user is detected in checking in step S3204 to have set the staple item from "no staple" to "staple" in the output form will be explained.

The control unit (1010) determines that a set item exists, and the process advances to step S3205. The control unit (1010) saves the set item information in the printing attribute information table of each file which is saved in the disk device of the memory unit (1030) and has a format as shown in FIG. 19 (step S3205). As a result, the "staple" item of the printing attribute information table in FIG. 19 changes to "staple".

By referring to the printing attribute information table of FIG. 19, the control unit (1010) determines whether an item on the layout has been set (step S3206). The content (staple) saved in step S3205 is not an item on the layout but an item on the output form, and the control unit (1010) determines that no item on the layout has been selected. The process then advances to step S3208.

Figure 16:
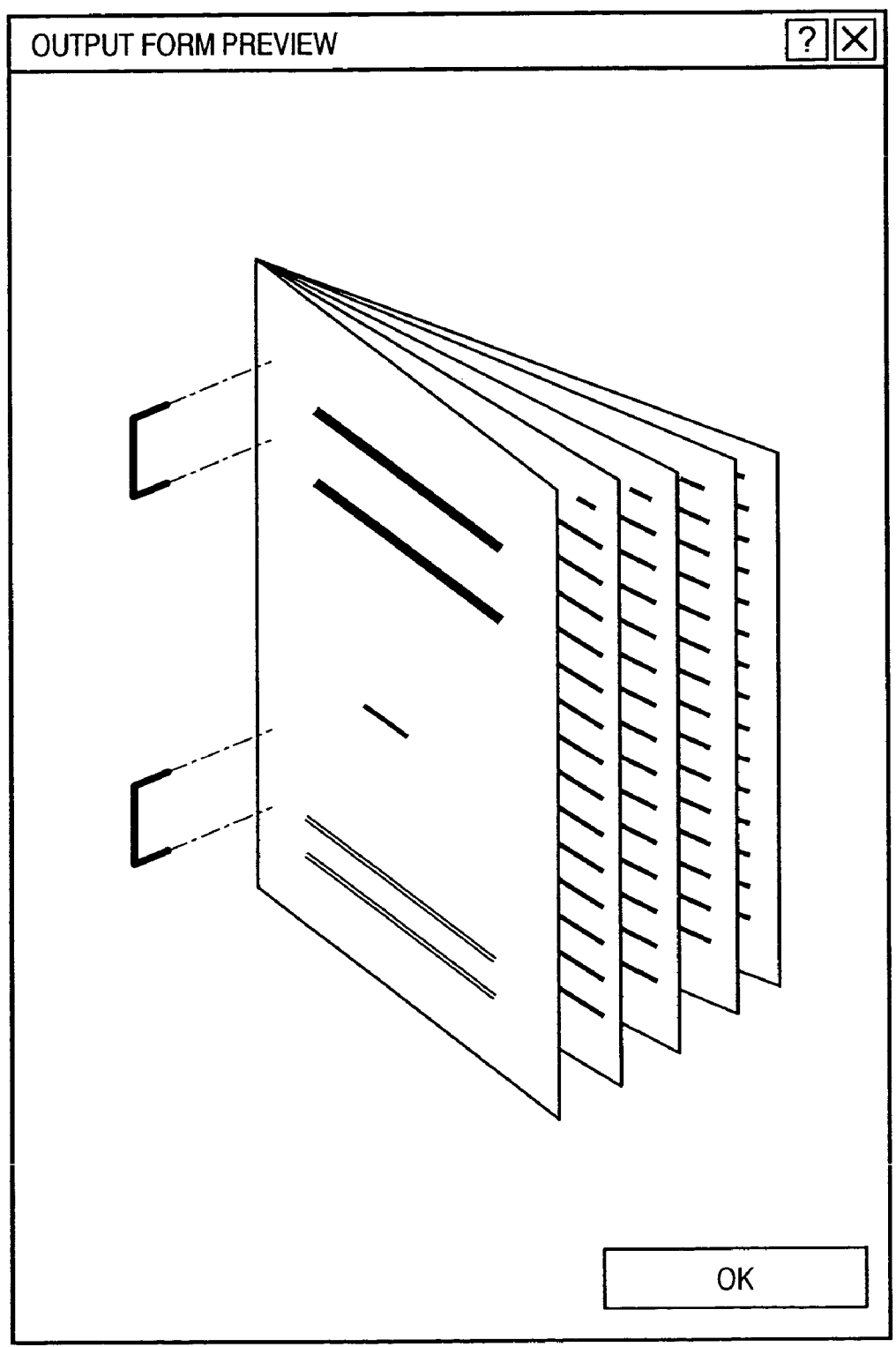

The control unit (1010) determines whether the output form confirmation button 91 has been selected in the printing attribute setting dialog (step S3208). If the output form confirmation button has been selected, the process advances to step S3209, and the control unit (1010) displays an output form preview dialog as shown in FIG. 16 on the display unit (1040). FIG. 16 shows a preview of the output form which reflects the staple item "staple" of the printing attribute information table saved in step S3205. Since the preview which immediately reflects a change of the printing attribute is displayed, the user can easily grasp how the setting change is reflected in the output form. Processes in steps S3210 to S3213 have been described above.

■(Preview Process Upon Designation of Bookbinding)

A process when the user is detected in checking in step S3204 to have set the bookbinding item from "no bind" to "bind" in the output form will be explained.

The control unit (1010) determines that an arbitrary item has been set, and the process advances to step S3205. The control unit (1010) saves the set item information in the above-mentioned printing attribute information table (step S3205). As a result, the "bookbinding" item of the printing attribute information table changes to "bind".

By referring to the printing attribute information table, the control unit (1010) determines whether an item on the layout has been selected in step S3205 (step S3206). The content (bookbinding) saved in step S3205 is an item on the layout, and the process of the control unit (1010) advances to step S3207. In order to update the display contents, the control unit (1010) displays a layout preview dialog as shown in FIG. 12 on the display unit (1040) by referring to the printing attribute information table of FIG. 19 (step S3207).

Figure 12:
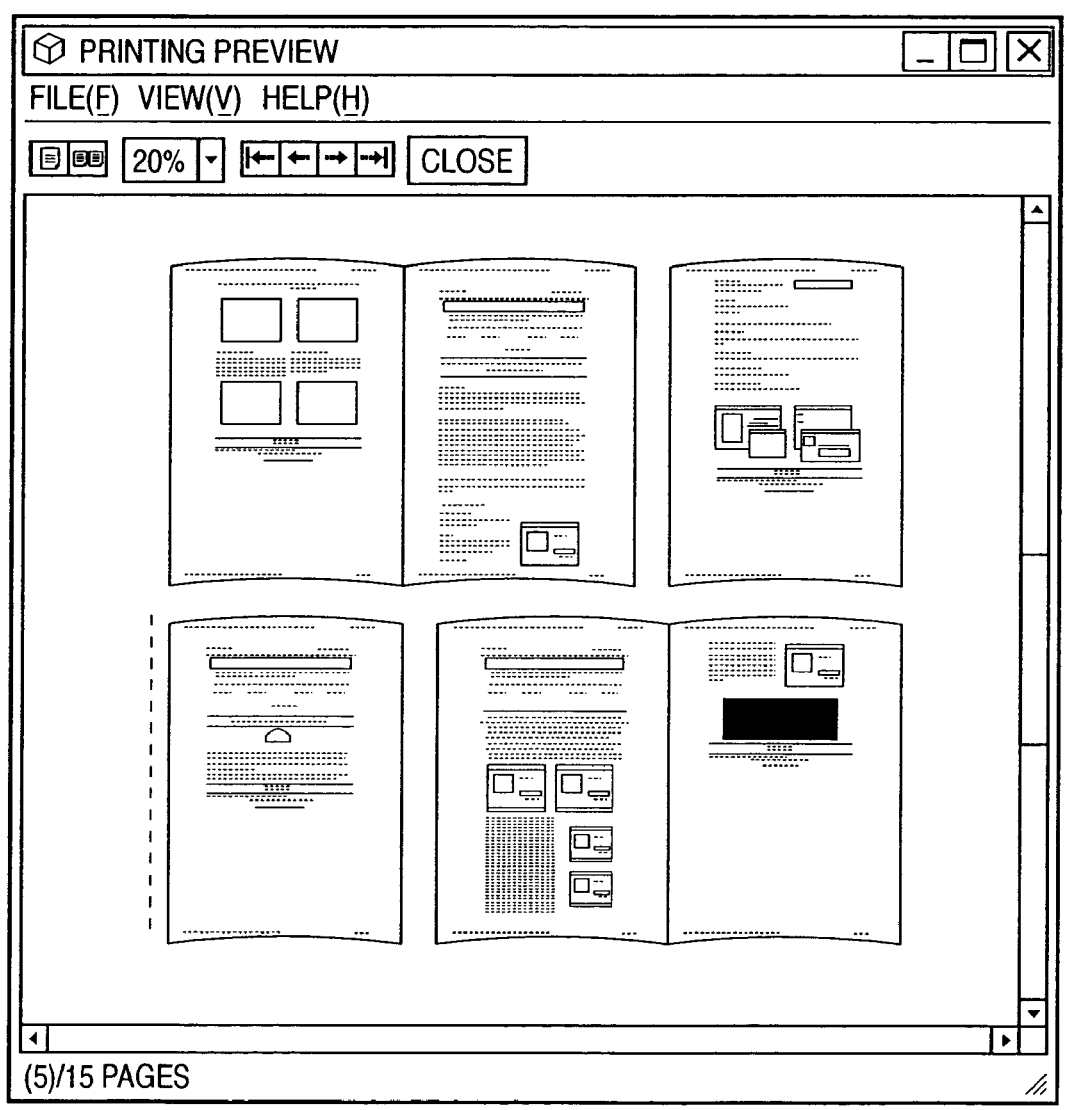

As shown in FIG. 12, the layout preview dialog immediately reflects a setting change, and the user can easily confirm how the bookbinding item set in FIG. 9 is reflected in the layout. The process of the control unit (1010) then advances to step S3208.

If the output form confirmation button 91 of the printing attribute setting dialog has been selected in step S3208, the control unit (1010) displays an output form preview dialog as shown in FIG. 17 in step S3209. FIG. 17 shows a preview of the output form which reflects the bookbinding item "bind" of the printing attribute information table saved in step S3205. Since the preview which immediately reflects a change of the printing attribute is displayed, the user can easily grasp how the setting change is reflected in the output form. Processes in steps S3210 to S3213 have been described above.

■(Preview Process Upon Designation of Insert)

A process when the user is detected in checking in step S3204 to have set the insert item from "no insert" to "insert" in the output form will be explained.

The insert (cover insert) function is to insert an arbitrary paper sheet into an arbitrary portion of output pages. The insert function includes a cover insert function of inserting a cover at the start of output pages, a slip sheet function of inserting a blank sheet into an arbitrary page of output pages, and a tab sheet function of inserting a tab sheet into an arbitrary page of output pages.

In step S3205, the control unit (1010) saves the set item information in the printing attribute information table of each file. Consequently, the "insert" item of the printing attribute information table in FIG. 19 changes to "insert". By referring to the printing attribute information table, the control unit (1010) determines whether the information content (insert) saved in step S3205 is an item on the layout (step S3206). The content saved in step S3205 is an item on the layout, and the process advances to step S3207. The control unit (1010) displays a layout preview dialog as shown in FIG. 14 on the display unit (1040) by referring to the printing attribute information table.

FIG. 14 shows a preview of printing attributes concerning the layout by referring to the printing attribute information table saved in step S3205. A menu 141 for selecting the insert function is displayed at the upper right portion of the dialog in response to setting the insert function to "insert". If the user sets "cover printing" as the insert function from the menu 141, the control unit (1010) displays a layout preview including a cover, as shown in FIG. 14. By referring to the layout preview dialog, the user can confirm how the insert item set in FIG. 9 is reflected in the layout. The process of the control unit (1010) then advances to step S3208.

The control unit (1010) determines whether the output form confirmation button 91 has been selected in the printing attribute setting dialog (step S3208). In this case, the output form confirmation button 91 has not been selected. Hence, the process advances to step S3212 to perform the above-described process.

■(Preview Process Upon Designation of Insert)

The process when only one item is set has been described. A process when it is detected in checking in step S3204 that two A4 and A3 original sheet sizes and two A4 and A3 output sheet sizes are set as layout items, and bookbinding, Z-folding, and cutting are set as output form items will be explained.

Z-folding is a function of, after delivering a large-size paper sheet such as an A3 paper sheet, folding it into ½ or ¼ along the longitudinal side into a Z shape when viewed from the top of the folded sheet. Cutting is a function of cutting an unbound side (for three-side cutting, upper side, right side in left opening, and lower side) with a guillotine upon bookbinding, thereby aligning the page size.

In step S3204, the control unit (1010) detects that the original size item and output size item in the layout have been set from "A4" to "A4+A3", the bookbinding item in the output form has been set from "no bind" to "bind", the Z-folding item has been set from "no Z-fold" to "Z-fold", and the cutting item has been set from "no cut" to "cut". The printing attribute setting dialog upon these settings changes as shown in FIG. 10. The control unit (1010) determines that arbitrary items have been set, and the process advances to step S3205.

The control unit (1010) saves the set item information in the printing attribute information table (step S3205). Consequently, the contents of the printing attribute information table change as shown in FIG. 20. By referring to the printing attribute information table shown in FIG. 20, the control unit (1010) determines whether the information contents saved in step S3205 are items on the layout (step S3206). The contents saved in step S3205 are items on the layout, and the control unit (1010) determines that the items on the layout have been selected. In order to update the display contents, the control unit (1010) displays a layout preview dialog as shown in FIG. 13 on the display unit (1040) by referring to the printing attribute information table of FIG. 20.

Figure 13:
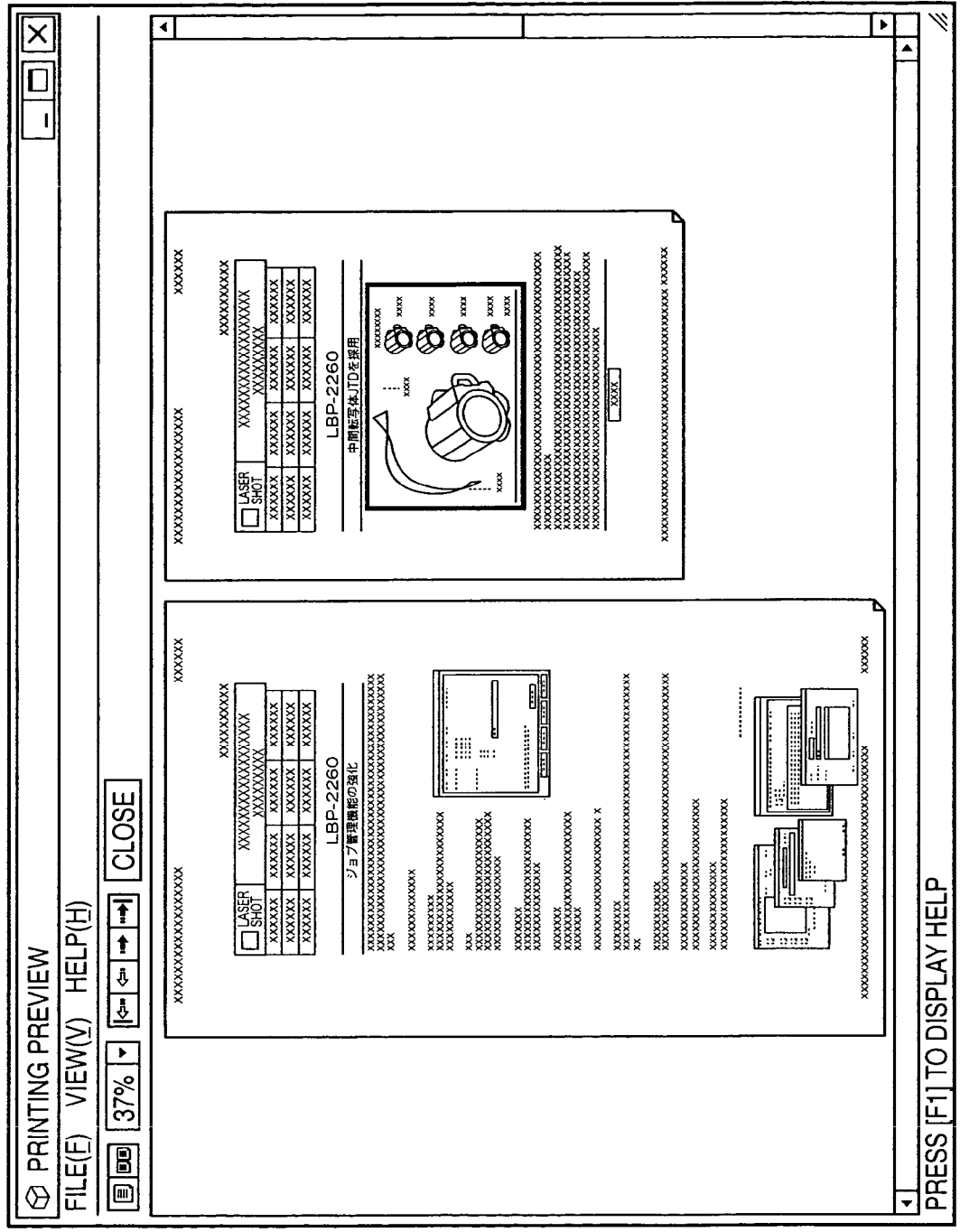

FIG. 13 shows a preview of printing attributes concerning the layout by referring to the printing attribute information table saved in step S3205. By referring to the layout preview dialog, the user can confirm how the original sheet size item at which A4 and A3 are set is reflected in the layout. The process of the control unit (1010) advances to step S3208.

The control unit (1010) determines whether the output form confirmation button 91 has been selected in the printing attribute setting dialog of FIG. 10 (step S3208). If the output form confirmation button 91 has been selected, the process advances to step S3209, and the control unit (1010) displays an output form preview dialog as shown in FIG. 18 on the display unit (1040).

Figure 18:
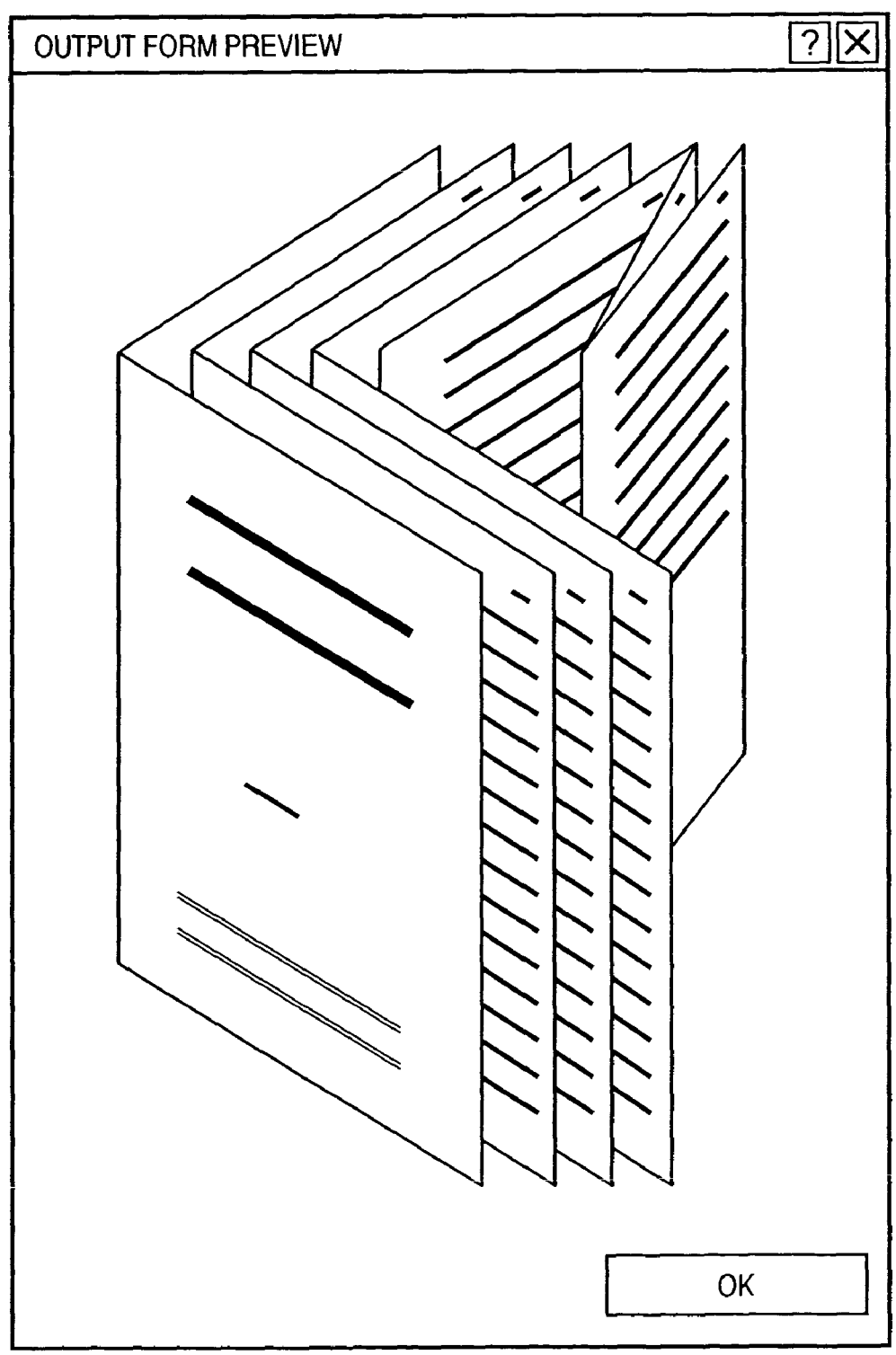

FIG. 18 shows a preview of the output form which reflects the bookbinding item "bind" and the Z-folding item "Z-fold" in the printing attribute information table saved in step S3205. Since the output form preview dialog quickly reflects detailed user changes, the user can easily grasp the changed contents.

The control unit (1010) determines whether the OK button has been selected in the output form preview dialog (step S3210). If the OK button is selected, the process advances to step S3211, and the control unit (1010) cancels the output form preview dialog.

The control unit (1010) determines whether the printing attribution setting completion button 93 has been selected in the attribute setting dialog shown in FIG. 10 (step S3212). In this case, the control unit (1010) determines that the printing attribution setting completion button has been selected. The process of the control unit (1010) then advances to step S3303 (FIG. 33).

■(Collection of Device Information)

After printing attributes are set, the control unit (1010) acquires address information of an available device via the connection unit (1020) by a method of, e.g., broadcasting an inquiry command to the network 701 (FIG. 5). The acquired address information is saved in a device information table in the RAM of the memory unit (1030) in a format as shown in FIG. 21 (step S3301).

The control unit (1010) communicates with each device by using the acquired address information, and acquires performance information of each device. More specifically, a control command for acquiring performance information (e.g., monochrome/color, engine speed, double-sided/bookbinding/presence or absence of staple function/cost) saved in the ROM of the memory unit (2030) of the device is transferred to a control unit (2010) of the printer via the connection unit (1020) of the host and the connection unit (2020) of the device in FIG. 1.

The acquired performance information of each device is saved in the device information table in the RAM of the memory unit (1030) in a format as shown in FIG. 22 (step S3302). At this time, if the performance information of each device does not contain cost information (e.g., process cost (color/monochrome) per page, and the cost of an additional process such as staple and bookbinding), predetermined cost information is added for each model. The cost information can be stored in, e.g., the disk device. Alternatively, the user may edit the cost information. Information on the installation place of the device can also be added to the device information table. The installation place information may also be stored in, e.g., the disk device. The control unit (1010) acquires the set printing attribute information by referring to the printing attribute information table in the disk device of the memory unit (1030) (step S3303).

■(Device Narrowing Process)

The control unit (1010) acquires "cost" information as the default value of the narrowdown item in the system by referring to the disk device of the memory unit (1030) of the host. Based on this narrowdown item, the control unit (1010) creates an adaptive environment table as shown in FIG. 25 from the device information table and printing attribute information table acquired in advance, and saves the adaptive environment table in the disk device of the memory unit (1030) (step S3304).

More specifically, the control unit (1010) extracts device combinations capable of executing a printing process from various conditions contained in the printing attribute table and the contents of the device information table, and sorts the extracted combinations by the narrowdown item. In this example, the narrowdown item is "cost", and the total cost is calculated for each device combination (environment) from the process of each device during the printing process and its cost information. Device combinations are aligned in order from a device combination having the lowest total cost, and an adaptive environment table in which each device performance is written in a "performance" column is created.

For example, cost information of "Dev-A" is acquired as performance information of FIG. 22 by a control command. The acquired cost is a cost per sheet, and "Dev-A" costs "¥6" per sheet in this case. This information is added to performance information. In this case, "Dev-B" costs ¥8; "Dev-C", ¥9; "Dev-D", ¥5; "Dev-E", ¥4; "Dev-F", ¥0.5; "Dev-G", ¥10; "Dev-X", ¥1; and "Dev-Y", ¥0.2. Since bookbinding is designated as shown in FIG. 20, "Dev-C", "Dev-D", "Dev-F", and the like are necessary to realize this function. Since cutting is designated, "Dev-G" and "Dev-X" are necessary. In order to realize the designated functions, these devices are combined to determine devices such as "Dev-E"+"Dev-F"+"Dev-X"+"Dev-Y". The cost in the use of devices in a plurality of combinations is calculated from the above-described performance information. A combination "environment-01" in FIG. 25 costs "¥5.7". The cost is calculated for each combination, and environments are aligned from "environment-01" in order from lower cost.

At this time, if color or color & monochrome printing is designated in the printing information table, the contents of a printing file to be printed are checked to detect whether the file contains a monochrome page (printing file contains character information and image information for each page, and contains color information for each information. For example, for a PS (PostScript) file, color information is added to a description representing a character or the like. Whether a character or image having color information other than color information representing "black" or "white" exists in a page is determined for each page, and if so, the target page can be determined as a color page; otherwise, as a monochrome page). If a monochrome page exists, devices are narrowed down and the cost is calculated on the assumption that a monochrome page is output by a monochrome device and a color page is output by a color device, thereby creating an adaptive environment table.

When "place" is selected as a narrowdown item, an adaptive environment table in which environments are aligned from an environment containing many devices near the host is created. Narrowing based on the place can be executed by an arbitrary method. For example, as information on the installation place, places where the host and devices in the system are installed are divided into a plurality of regions, and numbers representing setting regions are adopted. In this case, device combinations can be aligned from a device combination containing many devices having the same region number as that of the host.

Figure 23:
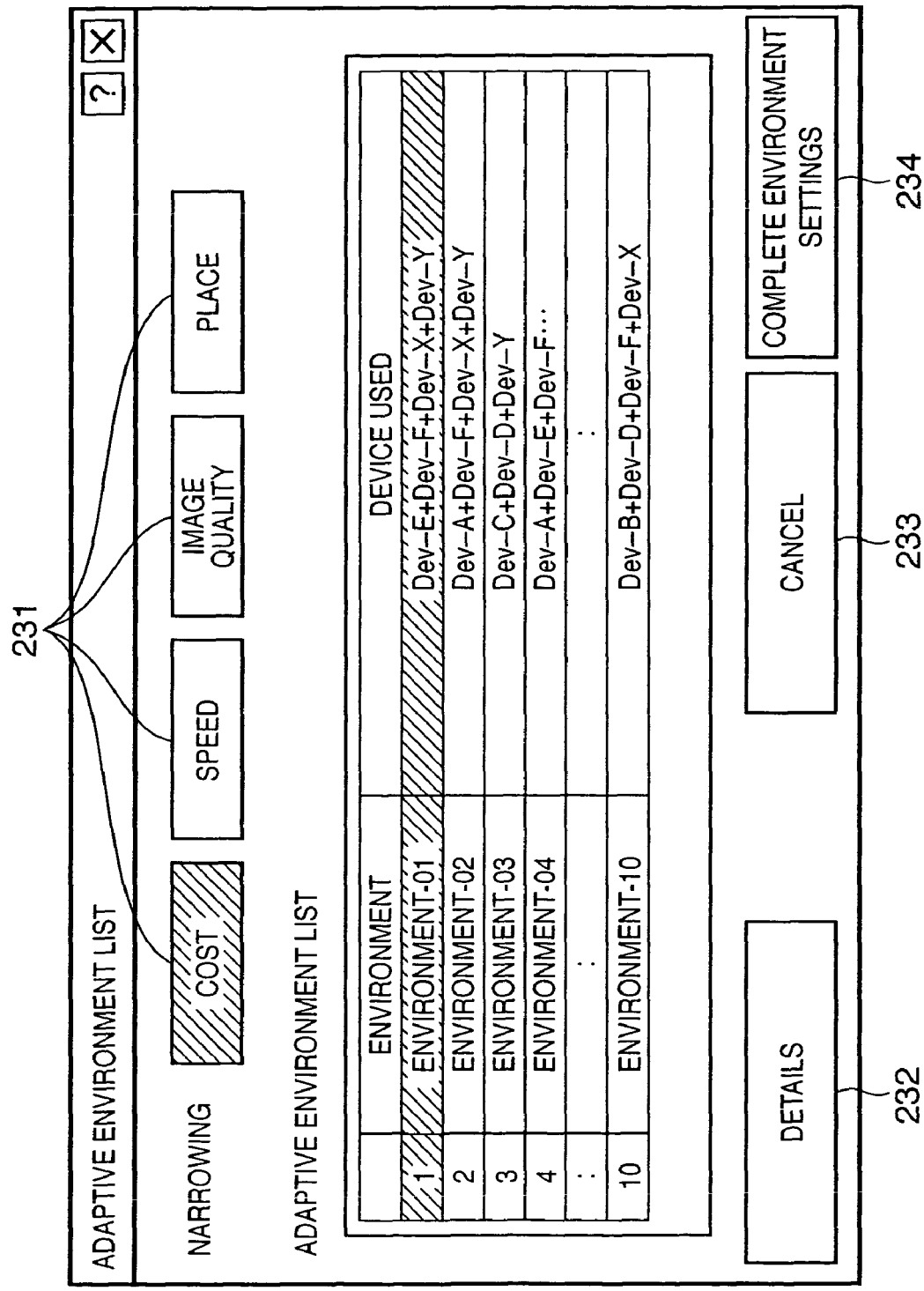
FIGS. 23 and 24 are views showing examples of an adaptive environment list dialog displayed by the host according to the embodiment of the present invention.

The control unit (1010) displays an adaptive environment list dialog as shown in FIG. 23 on the display unit (1040) by referring to the adaptive environment table as shown in FIG. 25 that is saved in the disk device of the memory unit (1030) (step S3305). The adaptive environment list dialog of FIG. 23 exhibits device combinations available for executing a layout and output process set by the user on the basis of "cost" which is the default value of the narrowdown item in the system. More specifically, "environment-01" is the most suitable for cost-preferential printing in the output form as shown in FIG. 18 with the printing attributes shown in FIG. 10, and "environment-10" is the least suitable.

The control unit (1010) determines whether the narrowdown item has been changed in the adaptive environment list dialog of FIG. 23 (step S3306). If the user selects a narrowdown item selection button 231 to change the narrowdown item from the default value "cost" to "speed", the control unit (1010) saves the changed narrowdown item information in the RAM of the memory unit (1030) in step S3707, and returns to step S3304.

By referring to the disk device of the memory unit (1030) of the host, the control unit (1010) acquires "speed" information as the current value of the narrowdown item in the system. Based on this narrowdown item, the control unit (1010) creates an adaptive environment table in the data format as shown in FIG. 25 from the device information table and printing attribute information table acquired in advance, and saves the adaptive environment table in the disk device of the memory unit (1030) (step S3304). The control unit (1010) displays an adaptive environment list dialog as shown in FIG. 24 on the display unit (1040) by referring to the adaptive environment table in the data format as shown in FIG. 25 that is saved in the disk device of the memory unit (1030) (step S3305).

Figure 24:
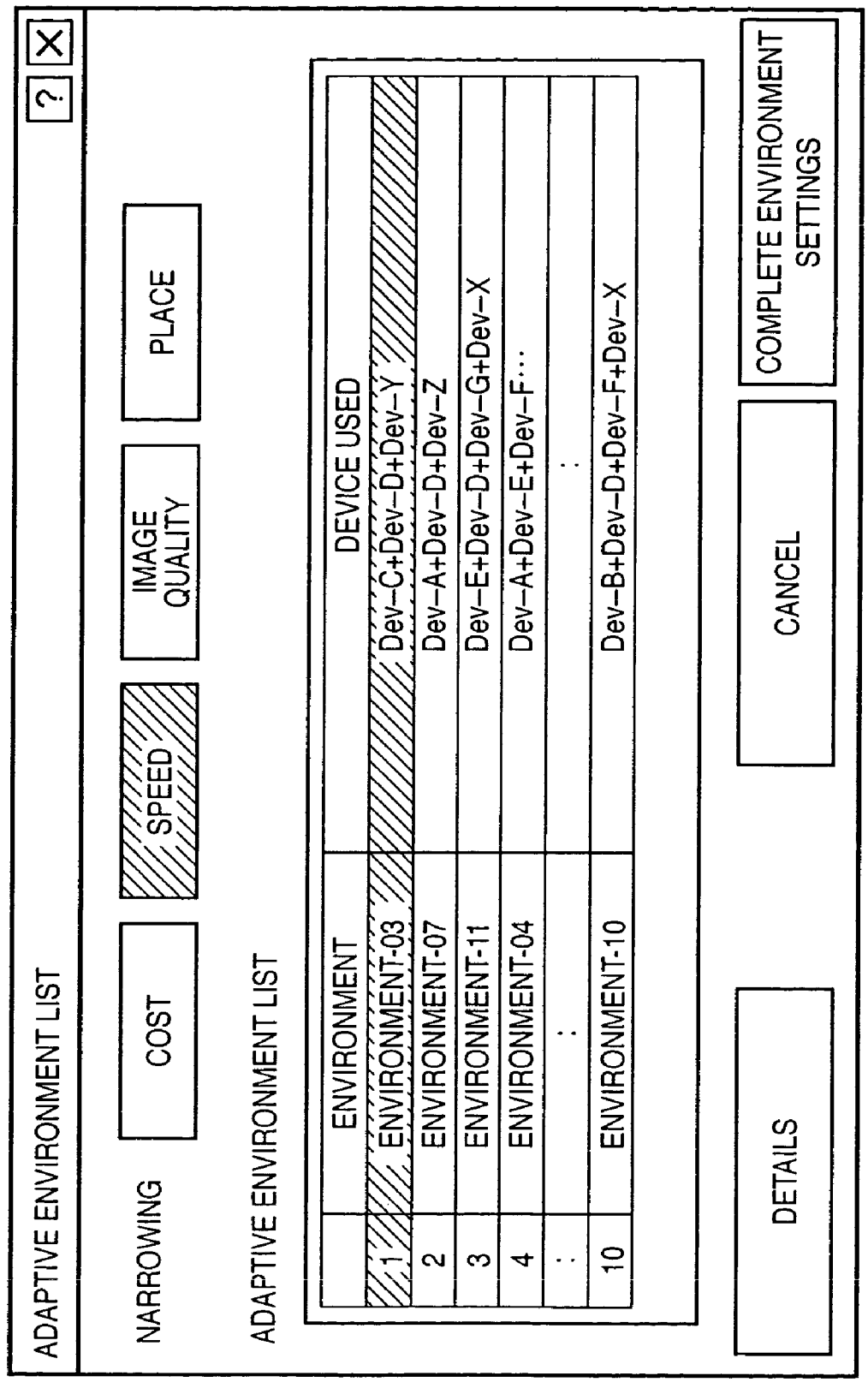

The adaptive environment list dialog of FIG. 24 exhibits device combinations available for executing a layout and output process set by the user on the basis of "speed " which is the current value of the narrowdown item in the system. More specifically, "environment-03" is the most suitable for speed-preferential printing in the output form as shown in FIG. 18 with the printing attributes shown in FIG. 10, and "environment-10" is the least suitable.

The control unit (1010) determines whether the narrowdown item has been changed in the adaptive environment list dialog of FIG. 24 (step S3306). If the user changes the narrowdown item from "speed" to "cost", the control unit (1010) generates the adaptive environment list dialog shown in FIG. 23, and displays it on the display unit (1040) (step S3305). Also if the narrowdown item is changed to "image quality" or "place", the control unit (1010) similarly generates an adaptive environment list dialog from the device information table and printing attribute information table, and displays the generated dialog.

■(Process Flow Generation Process)

If no narrowdown item has been changed in step S3306, the control unit (1010) determines which of environments in the list display has been selected in the adaptive environment list dialog of FIG. 23 (step S3308). If no environment has been selected, the process returns to step S3306. If the user selects "environment-10" in the adaptive environment list dialog of FIG. 23, the process advances to step S3309.

In step S3309, the control unit (1010) determines whether a detail button 232 in the adaptive environment list dialog of FIG. 23 has been selected. If the user selects the "detail button" in the adaptive environment list dialog of FIG. 23, the process advances to step S3310.

By referring to the disk device of the memory unit (1030), the control unit (1010) acquires information on the printing attribute information table in the state of FIG. 20 and the adaptive environment table in the state of FIG. 25. The control unit (1010) creates a process flow table in a data format as shown in FIG. 26 for "environment-10", and saves the process flow table in the disk device of the memory unit (1030) (step S3310). The control unit (1010) displays on the display unit (1040) a process flow dialog (FIG. 28) corresponding to the process flow stored in the flow table (step S3311).

Data necessary to generate a process flow table in step S3310, i.e., a message representing a procedure may be given to each device and acquired in response to selection of the "detail" button. Alternatively, messages may be registered in advance in the host or combined.

For example, a device-dependent message may be given to each device, and a device-independent message such as a procedure of moving a printed material output from a given device to another device or a message about a standard process procedure may be registered in the host.

A device-dependent message can also be registered in the host. However, maintenance such as support for a new model becomes cumbersome, and thus a device-dependent procedure message is preferably given to each device.

Messages representing procedures are prepared in steps processible by each device, such as "preparation step", "printing process step", and "bookbinding step". One or more messages are registered in time series for each step. As for a step having various types, such as a printing process step, the step can be further subdivided into "printing process step (color)", "printing process step (monochrome)", and "printing process step (double-sided)".

The control unit (1010) acquires the messages of steps from devices used in an environment selected in the adaptive environment list dialog, and then determines which step is assigned to each device, from information of the printing attribute information table. The control unit (1010) creates a process flow table by using the messages of process procedures corresponding to steps.

For example, when a color & monochrome job is to be printed by printing a monochrome page by a monochrome printing device and a color page by a color printing device (for example, cost priority is designated in color printing or color & monochrome printing), not only device names but also page numbers subjected to printing by each printing device are contained in a message. This eliminates the need for dividing a printing file into a file of color pages and a file of monochrome pages by the user. The user only instructs each printing device of page numbers subjected to printing, improving the operability.

At this time, a process flow is generated in accordance with a predetermined description rule such that the start and end of a process are described subsequent to "YY", the message of each procedure is enclosed between square brackets ("[]"), and "/" is used as a separator between procedures.

The control unit (1010) interprets the description rule to generate a process flow dialog.

In this way, the user can confirm a work procedure in the process flow dialog before the start of an actual printing process, and can efficiently perform work. As shown in FIG.

28, a monochrome device (Dev-D) and color device (Dev-B) operate parallel at the start of work, and their outputs are collected to perform work such as mixed bookbinding at an arbitrary timing. In this case, the user can easily grasp the work procedures. The user can return to setting work in terms of the process procedures, and change the settings of the layout and output process.

Figure 28:
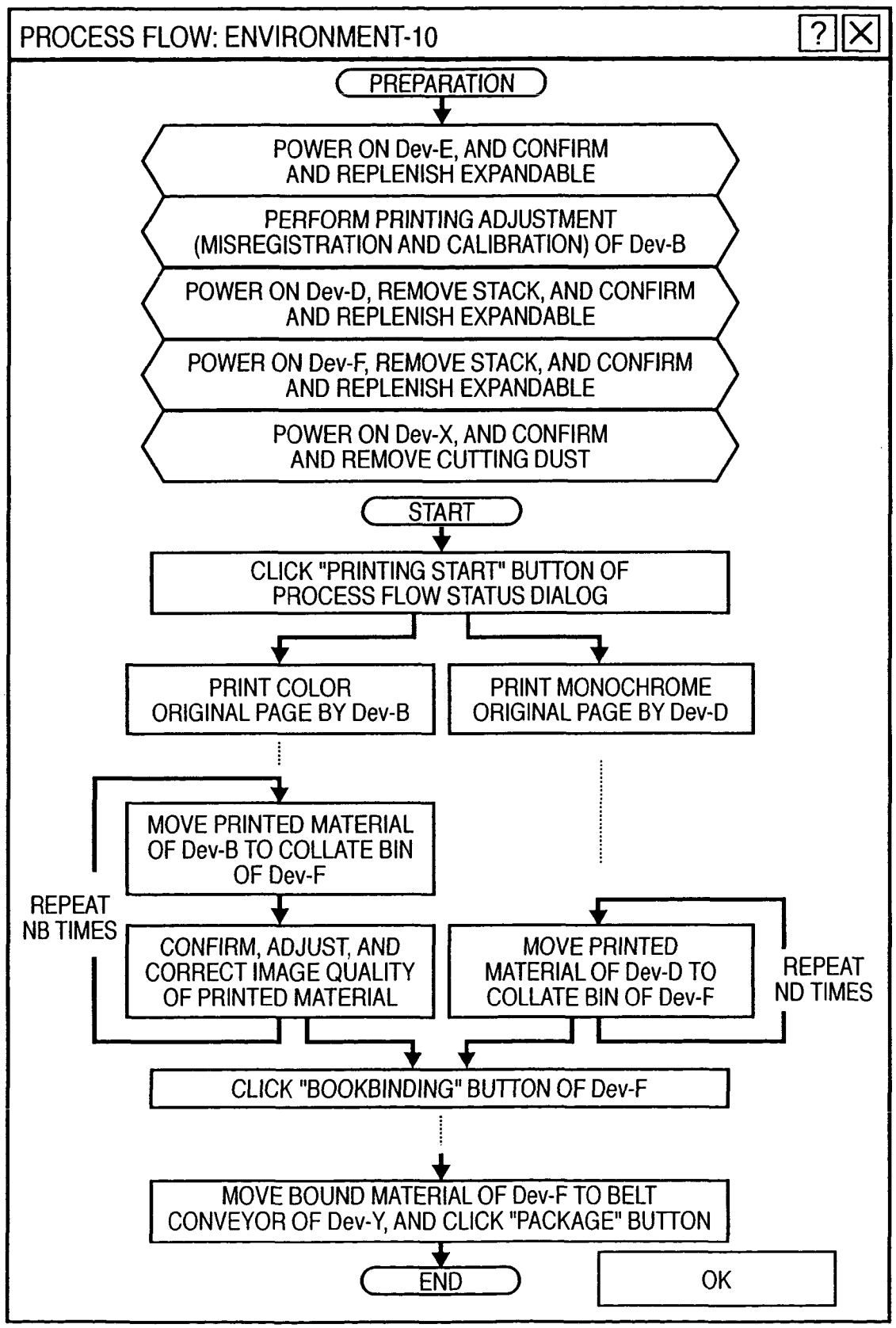

The control unit (1010) determines whether the OK button has been selected in FIG. 28 (step S3312). If NO in step S3312, the process of the control unit (1010) returns to step S3312; if YES, to step S3313. The control unit (1010) cancels the process flow dialog as shown in FIG. 28 from the display unit (1040) (step S3313), and advances to step S3314.

In step S3314, the control unit (1010) determines whether an environment setting completion button 234 has been selected in the adaptive environment list dialog of FIG. 23 (step S3314). If NO in step S3314, the process advances to step S3315 to determine whether a cancel button 233 has been selected.

If YES in step S3315, the control unit (1010) cancels the adaptive environment list dialog as shown in FIG. 23 from the display unit (1040) (step S3316), and returns to step S3204. If NO in step S3315, the process returns to step S3306.

Figure 27:
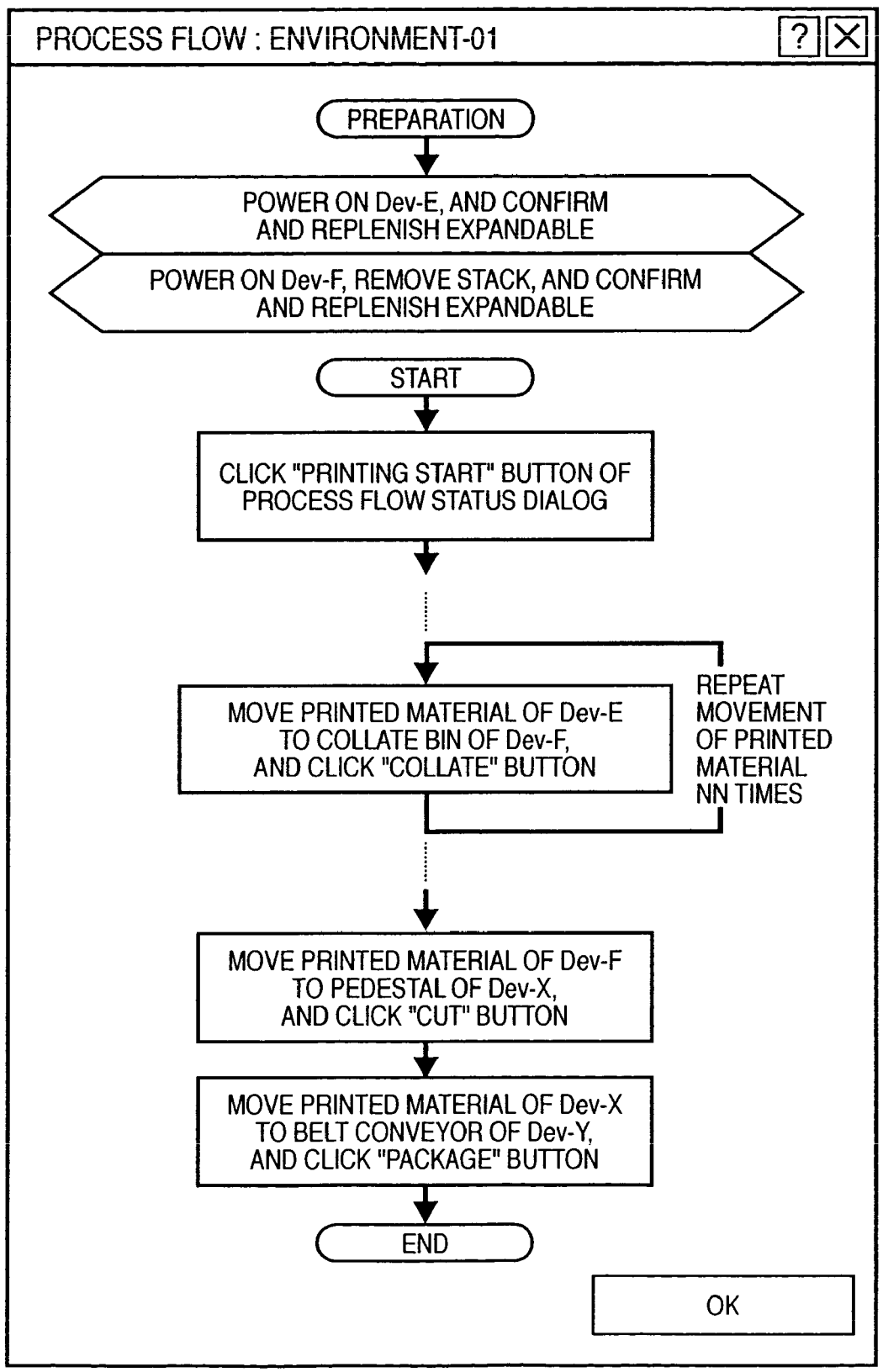
FIGS. 27 to 30 are views showing examples of a process flow dialog generated and displayed by the host according to the embodiment of the present invention.

FIGS. 26 and 27 are views showing a process flow table and process flow dialog generated in steps S3310 and S3311 when "environment-01" and "detail button" are selected in the adaptive environment list dialog shown in FIG. 23.

If the OK button is selected in step S3312, the control unit (1010) cancels the process flow dialog, and advances to step S3314. If the environment setting completion button 234 in the adaptive environment list dialog of FIG. 23 has been selected in step S3314, the process advances to step S3401 (FIG. 34).

Figure 29:
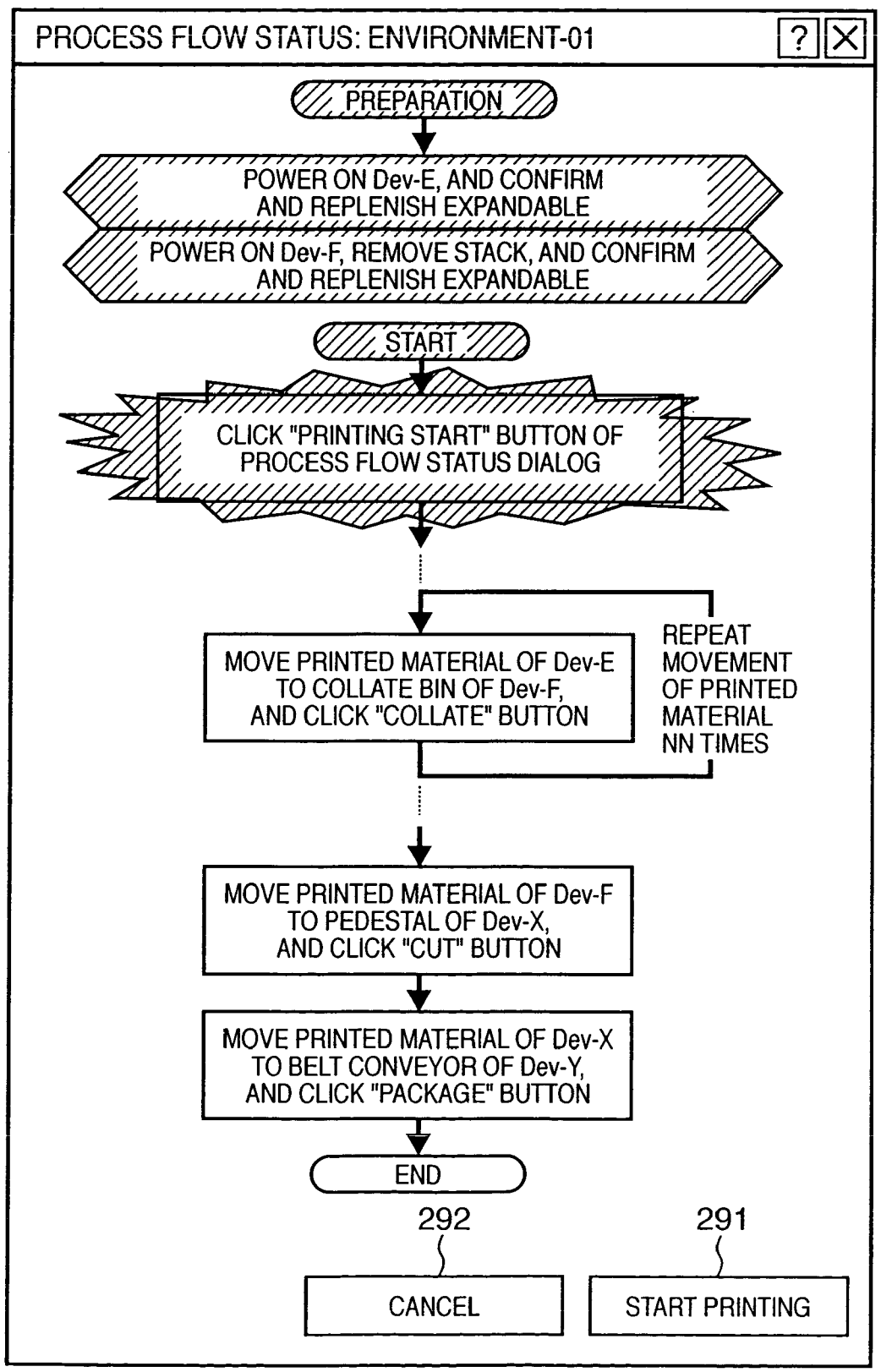

In step S3401, the control unit (1010) determines that work corresponding to a "preparation" process in the process flow dialog displayed in step S3311 has already ended, and displays a process flow status dialog as shown in FIG. 29 on the display unit (1040). Of steps included in the process flow status dialog, a process to be first executed by the user is emphatically displayed. As the emphatic display method, various methods are available such that the color of only the step is changed, the step is displayed large or bold, or the step is flickered. In this case, the step is flickered. In FIG. 29, a portion "click the 'printing start' button in the process flow status, dialog" is flickered to notify the user of the current process status and urge the user to perform the next work.

In step S3402, the control unit (1010) determines whether the printing start button in the process flow dialog of FIG. 29 has been selected. If a printing start button 291 has not been selected, the control unit (1010) determines in step S3403 whether a cancel button 292 has been selected. If YES in step S3403, the control unit (1010) cancels the process flow status dialog of FIG. 29 from the display unit (1040) (step S3404), and returns to step S3304 (FIG. 33) to display the adaptive environment list dialog. If NO in step S3403, the process returns to step S3402.

If YES in step S3402, the control unit (1010) starts a printing process (step S3405). The control unit (1010) creates printing data to be transmitted to a device by referring to a printing file saved in the disk device of the memory unit (1030), and saves the printing data in the disk device of the memory unit (1030) (step S3406). The control unit (1010) acquires the network address of the host from the running system (OS), and saves the acquired address as event notification destination address information in the RAM of the memory unit (1030) (step S3407).

The event notification destination address information is used when the device sends the progress of a process as an event. The control unit (1010) adds the event notification destination address information to printing data saved in the disk device of the memory unit (1030) (step S3408), and transmits the printing data to the device (step S3409). In step S3410, the control unit (1010) waits for reception of a job process end event from the device.

If a job end event is transmitted by a device process to be described later and reception of the job end event is detected, the process of the control unit (1010) advances to step S3411. The control unit (1010) analyzes the content of the received job process end event (step S3411), and determines whether all print processes have ended (step S3412). If YES in step S3412, the output process ends.

If the control unit (1010) has received a job end event representing the end of a job other than the end of a print process, it updates a step of emphatically displaying the process flow status dialog in accordance with the analysis result in step S3411 (step S3413), and returns to step S3410.

Figure 30:
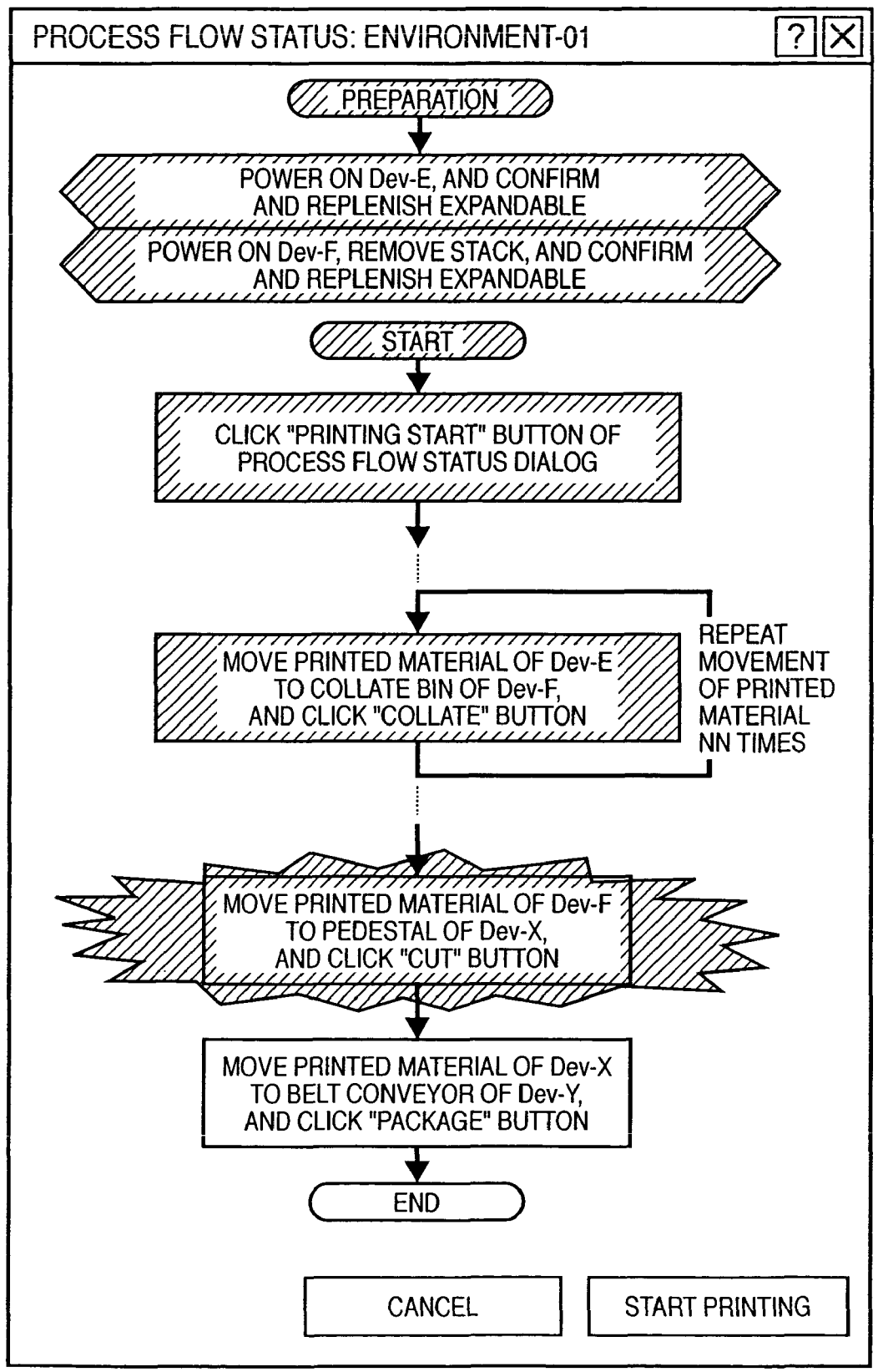

Every time events are received from one or a plurality of devices, the control unit (1010) repetitively executes steps S3410 to S3413. The emphatic display portion of a process performed by the device or a process to be performed by the user sequentially moves in the process flow status dialog. FIG. 30 shows a state in which the process has proceeded from the state of FIG. 29 and the emphatic display portion has moved. In this manner, an event is received from a device, and the information is reflected in the process flow status dialog. The user can recognize the process status in real time.

In FIG. 34, for descriptive convenience, printing data is transmitted only once. A case wherein printing data is transmitted to a plurality of devices or a plurality of number of times can also be coped with by sequentially performing processes in accordance with the process flow such that printing data is generated and transmitted in accordance with the reception result of a job end event.

■(Device Process)

A device process according to the embodiment will be explained with reference to the flow chart shown in FIG. 35. The process described in this flow chart is realized when the control unit (2010) of the device in FIG. 1 including a CPU (not shown) and the like executes a software module stored in a memory device such as a ROM or disk device.

The control unit (2010: FIG. 1) of the device determines whether printing data has been received (step S3501). If NO in step S3501, the control unit (2010) determines in step S3504 whether it has received an inquiry. For example, if the host inquires the performance of the device in step S3302 in the above-described host process, this inquiry is detected in this step.

If YES in step S3504, the control unit (2010) of the device analyzes the received control data and processes a content to the inquiry in step S3505. If the inquiry content is a performance information inquiry, the control unit (2010) of the device transmits, to the host, performance information saved in the ROM of the memory unit (2030) of the device as a reply to the inquiry (step S3506).

If NO in step S3504, the control unit (2010) of the device determines whether an unprocessed job which should be processed exists (step S3507). If printing data has not been saved in the disk device of the memory unit (2030) of the device, the control unit (2010) of the device determines that a job to be processed does not exist, and advances to step S3509. In step S3509, the control unit (2010) determines whether the job process has ended. If a job is not performed or is in progress, the control unit (2010) returns to step S3501.

If YES in step S3501, the control unit (2010) of the device temporarily saves the received printing data in the disk device of the memory unit (2030) of the device (step S3502). The control unit (2010) analyzes the temporarily saved printing data, and saves an event notification destination address in the disk device of the memory unit (2030) of the device in the form of an event notification destination address table as shown in FIG. 31 (step S3503).

Processes in step S3504 and subsequent steps are executed in the above-described manner, and the printing data is detected in step S3507 as a job to be processed. In step S3508, the control unit (2010) outputs the printing data. The end of the output process is detected in step S3509, and in step S3510, the control unit (2010) of th device acquires an event notification destination address by referring to the event notification destination address table saved in the disk device of the memory unit (2030) of the device (step S3510). The control unit (2010) then transmits a job process end event to the host at the event notification destination address (step S3511).

According to the embodiment, a print process desired by the user and an optimal device combination corresponding to a preferential condition are presented, and actual process procedures are visually provided. Even an inexperienced user can reliably execute efficient printing work.

Particularly, checking or replenishment of the expandable is prompted as a preparation process before execution of printing. This embodiment can suppress occurrence of a situation in which an expandable runs short immediately after the start of a printing process, and settings are done again or the process suspends.

Since a flow in which a condition such as cost or speed has temporarily been selected can be canceled, the user can freely find out a printing method optimal for the user depending on the time, distance, process time, or the like.

Individual process methods for a plurality of devices which appear in the process flow are also displayed, and a desired final output form can be obtained without checking the detailed operation method of each device.

As has been described in detail above, the present invention visually provides a device combination and its process procedures for efficiently performing a printing process desired by the user. Even an inexperienced operator can efficiently perform work in accordance with the process procedures.

A step to be done is emphatically displayed, and a procedure to be performed next is also emphatically displayed every time the step ends. The operator can clearly know the current procedure and a process to be performed next. Even in a process using a plurality of printers, a reliable bookbinding process can be achieved without failing to pick up a page necessary for bookbinding from a printer. Even an inexperienced user can efficiently execute a complicated process.

According to the present invention, a candidate is automatically selected from a plurality of output destinations from printing process contents desired by the user. The user can obtain an appropriate candidate with high operability only by assigning priority to a given condition without knowing detailed specifications of an output device.

When a plurality of candidates exist, the contents are displayed, and the user can select a candidate under a condition other than a printing process (for example, select a printing device at a close place from output candidates with cost priority), further improving the operability.

If information on an output destination is obtained in advance, a search process can be executed within a shorter time than in a case wherein information is collected upon reception of a printing instruction.

Other Embodiment

The above embodiment has described only the use of an MFP as a device. The present invention can also be applied to a plotter, copying apparatus, FAX, or the like. Examples described in the above embodiment can also be replaced with the following examples.

The above embodiment has described only a host constituted by one device. The same function as the host of the present invention may be realized by a system constituted by a plurality of devices.

The present invention also includes a case wherein the same function is achieved when a software program (program corresponding to each flow chart) which realizes the functions of the above embodiment is supplied directly from a recording medium or via wire/wireless communication to a system or apparatus having a computer capable of executing the program, and the computer of the system or apparatus executes the supplied program.

The present invention is therefore realized by program codes which are supplied and installed in the computer in order to realize the functional process of the present invention by the computer. That is, the present invention includes a computer program for realizing the functional process of the present invention.

In this case, the present invention can take any program form such as an object code, a program executed by an interpreter, or script data supplied to an OS as long as a program function is attained.

A recording medium for supplying the program includes a magnetic recording medium (e.g., flexible disk, hard disk, or magnetic tape), an optical/magnetooptical storage medium (MO, CD-ROM, CD-R, CD-RW, DVD-ROM, DVD-R, or DVD-RW), and a nonvolatile semiconductor memory.

As a program supply method using wire/wireless communication, a computer program itself for realizing the present invention in the server of a computer network, or a data file (program data file) which provides a computer program for realizing the present invention in a client computer, such as a compressed file containing an automatic install function is stored, and a connected client computer is caused to download the program data file. In this case, the program data file can also be divided into a plurality of segment files to set them in different servers.

In other words, the present invention also includes a server apparatus which causes a plurality of users to download the program data file for realizing the functional process of the present invention in a computer.

The program of the present invention can be encrypted, stored in a storage medium such as a CD-ROM, and distributed to the user. A user who satisfies predetermined conditions is caused to download decryption key information from a homepage via th Internet. The user executes the encrypted program by using the key information, and installs the program in the computer.

The functions of the above embodiment are realized when the computer executes the readout program. Also, the functions of the above embodiment are realized when an OS or the like running on the computer performs some or all of actual processes on the basis of the instructions of the program.

The functions of the above embodiment are also realized when the program read out from the recording medium is written in the memory of a function expansion board inserted into the computer or the memory of a function expansion unit connected to the computer, the CPU of the function expansion board or function expansion unit performs some or all of actual processes on the basis of the instructions of the program.

As many apparently widely different embodiments of the present invention can be made without departing from the spirit and scope thereof, it is to be understood that the invention is not limited to the specific embodiments thereof except as defined in the appended claims.

What is claimed is:

1. A printing control apparatus which is connectable to a plurality of devices via a network, comprising:
    an acquisition unit configured to acquire an attribute of a printing job to be processed;
    a determination unit configured to determine a device combination capable of executing the job based on performance information representing performance of each of the plurality of devices and the acquired attribute of the job, the device combination including a first device and a second device which executes a process using a print product printed by the first device;
    a display unit configured to display a process flow list representing a process flow to execute the job by using the device combinations determined by the determination unit,
    the process flow list being a list in which display areas of a plurality of procedures which constitute the job are listed in the order of execution, the plurality of procedures including a process procedure to be performed by the first device, a work procedure in which a user moves the print product printed by the first device from the first device to the second device, and a process procedure to be performed by the second device; and
    a receiving unit configured to receive, via the network, information indicating that the first device has completed the process procedure to be performed by the first device,
    wherein said display unit changes a display form of a display area of the process procedure which is to be performed by the second device, among the plurality of procedures in the process flow list in a case where the receiving unit receives the information.

2. The apparatus according to claim 1, wherein, when a plurality of device combinations exist, said determination unit determines an order of the device combinations under a condition designated in advance, and presents the device combinations in that order.

3. The apparatus according to claim 2,
    wherein the performance information includes pieces of information on a printing speed, a cost, and a device installation place, and
    wherein said determination unit determines the order under a condition including any one of the printing speed, the cost, and the device installation place.

4. The apparatus according to claim 1,
    wherein the apparatus further comprises a state acquisition unit configured to acquire a process state of a printing device in use for executing the job, and
    wherein said display unit displays, emphatically in the process flow list, the procedure which is to be performed next, among the plurality of procedures.

5. The apparatus according to claim 1, wherein the process flow list includes a message which prompts checking or replenishment of an expandable used by the device as a preparation process.

6. The apparatus according to claim 1,
    wherein the apparatus further comprises a second display unit configured to display device combinations capable of executing the job so as to be able to select one of the device combinations, and
    wherein said display unit displays a process flow list of the printing process by a device combination selected via said second display unit.

7. The apparatus according to claim 1, wherein, when the attribute of the job contains color printing, said determination unit detects monochrome and color pages contained in the job, and determines a device combination so as to print the monochrome page by a monochrome printing device.

8. A printing control method for controlling a printing control apparatus which is connectable to a plurality of devices via a network, comprising:
    an acquisition step of acquiring an attribute of a job to be processed;
    a determination step of determining a device combination capable of executing the job based on performance information representing performance of each of the plurality of devices and the acquired attribute of the job, the device combination including a first device and a second device which executes a process using a print product printed by the first device;
    a display step of displaying a process flow list representing a process flow to execute the job by employing the determined device combinations and an operation method to be performed by a user in the second device,
    the process flow list being a list in which display areas of a plurality of procedures which constitute the job are listed in the order of execution, the plurality of procedures including a process procedure to be performed by the first device, a work procedure in which a user moves the print product printed by the first device from the first device to the second device, and a process procedure to be performed by the second device; and
    a receiving step of receiving, via the network, information indicating that the first device has completed the process procedure to be performed by the first device,
    wherein said display step changes a display form of a display area of the process procedure which is to be performed by the second device, among the plurality of procedures in the process flow list in a case where the information is received in said receiving step.

9. The method according to claim 8,
    wherein the method further comprises a display step of displaying device combinations capable of executing the job on a display device so as to be able to select one of the device combinations, and
    wherein, in the process flow display step, process flow of the job by a device combination selected via the display device is presented.

10. A non-transitory computer-readable medium storing program code for causing a computer to execute a method for controlling a printing control apparatus which is connectable to a plurality of printing devices, comprising:
    an acquisition step of acquiring an attribute of a job to be processed;
    a determination step of determining a device combination capable of executing the job based on performance information representing performance of each of the plurality of printing devices and the acquired attribute of the job, the device combination including a first device and a second device which executes a process using a print product printed by the first device;

a display step of displaying a process flow list representing a process flow to execute the job by employing the determined device combinations and an operation method to be performed by a user in the second device, the process flow list being a list in which display areas of a plurality of procedures which constitute the job are listed in the order of execution, the plurality of procedures including a process procedure to be performed by the first device, a work procedure in which a user moves the print product printed by the first device from the first device to the second device, and a process procedure to be performed by the second device; and a receiving step of receiving, via the network, information indicating that the first device has completed the process procedure to be performed by the first device, wherein said display step changes a display form of a display area of the process procedure which is to be performed by the second device, among the plurality of procedures in the process flow list in a case where the information is received in the receiving step.

* * * * *